(12) United States Patent
Manasse et al.

(10) Patent No.: US 8,112,496 B2
(45) Date of Patent: *Feb. 7, 2012

(54) EFFICIENT ALGORITHM FOR FINDING CANDIDATE OBJECTS FOR REMOTE DIFFERENTIAL COMPRESSION

(75) Inventors: Mark S. Manasse, San Francisco, CA (US); Dan Teodosiu, Bellevue, WA (US); Akhil Wable, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 340 days.

This patent is subject to a terminal disclaimer.

(21) Appl. No.: 12/533,437

(22) Filed: Jul. 31, 2009

(65) Prior Publication Data
US 2010/0064141 A1 Mar. 11, 2010

Related U.S. Application Data

(63) Continuation of application No. 10/948,980, filed on Sep. 24, 2004, now Pat. No. 7,613,787.

(51) Int. Cl.
*G06F 15/16* (2006.01)
(52) U.S. Cl. ........... 709/217; 709/238; 709/247; 706/13
(58) Field of Classification Search .................. 709/217, 709/238, 247; 706/13
See application file for complete search history.

(56) References Cited

U.S. PATENT DOCUMENTS

| | | | |
|---|---|---|---|
| 4,845,614 A | 7/1989 | Hanawa | |
| 4,853,842 A | 8/1989 | Thatte et al. | |
| 5,446,888 A | 8/1995 | Pyne | |
| 5,486,826 A | 1/1996 | Remilliard | |
| 5,488,364 A | 1/1996 | Cole | |
| 5,592,618 A | 1/1997 | Micka | |
| 5,592,661 A | 1/1997 | Eisenberg | |
| 5,596,710 A | 1/1997 | Voigt | |
| 5,673,382 A | 9/1997 | Cannon | |
| 5,721,907 A | 2/1998 | Pyne | |
| 5,724,323 A | 3/1998 | Mamiya | |
| 5,758,359 A | 5/1998 | Saxon | |
| 5,933,104 A | 8/1999 | Kimura | |
| 5,987,022 A | 11/1999 | Geiger et al. | |
| 5,987,432 A | 11/1999 | Zusman | |
| 5,990,810 A | 11/1999 | Williams | |
| 6,006,016 A | 12/1999 | Faigon | |

(Continued)

FOREIGN PATENT DOCUMENTS

EP    1 587 007 A2    10/2005

(Continued)

OTHER PUBLICATIONS

Singapore Patent Application No. 200501089-7, Examination report and Allowance mailed Nov. 13, 2006, 4 pgs.

(Continued)

*Primary Examiner* — Khanh Dinh
(74) *Attorney, Agent, or Firm* — Merchant & Gould PC

(57) ABSTRACT

The present invention finds candidate objects for remote differential compression. Objects are updated between two or more computing devices using remote differential compression (RDC) techniques such that required data transfers are minimized. An algorithm provides enhanced efficiencies for allowing the receiver to locate a set of objects that are similar to the object that needs to be transferred from the sender. Once this set of similar objects has been found, the receiver may reuse any chunks from these objects during the RDC algorithm.

12 Claims, 20 Drawing Sheets

U.S. PATENT DOCUMENTS

| | | | |
|---|---|---|---|
| 6,014,669 A | 1/2000 | Slaughter | |
| 6,044,475 A | 3/2000 | Chung | |
| 6,049,874 A | 4/2000 | McClain et al. | |
| 6,061,733 A | 5/2000 | Bodin et al. | |
| 6,101,507 A | 8/2000 | Cane et al. | |
| 6,157,931 A | 12/2000 | Cane et al. | |
| 6,166,735 A | 12/2000 | Dom et al. | |
| 6,205,449 B1 | 3/2001 | Rastogi | |
| 6,226,629 B1 | 5/2001 | Cossock | |
| 6,240,511 B1 | 5/2001 | Blumenau | |
| 6,269,362 B1* | 7/2001 | Broder et al. | |
| 6,272,547 B1 | 8/2001 | McWilliams | |
| 6,317,754 B1 | 11/2001 | Peng | |
| 6,374,250 B2 | 4/2002 | Ajtai et al. | |
| 6,377,974 B1 | 4/2002 | Feigenbaum | |
| 6,381,709 B1 | 4/2002 | Casagrande et al. | |
| 6,434,568 B1 | 8/2002 | Bowman-Amuah | |
| 6,449,612 B1 | 9/2002 | Bradley et al. | |
| 6,453,325 B1 | 9/2002 | Cabrera | |
| 6,477,629 B1 | 11/2002 | Goshey | |
| 6,496,901 B1 | 12/2002 | De Martine et al. | |
| 6,505,228 B1 | 1/2003 | Schoening et al. | |
| 6,571,282 B1 | 5/2003 | Bowman-Amuah | |
| 6,574,618 B2 | 6/2003 | Eylon et al. | |
| 6,574,657 B1 | 6/2003 | Dickinson | |
| 6,594,677 B2 | 7/2003 | Davis | |
| 6,604,236 B1 | 8/2003 | Draper et al. | |
| 6,618,758 B1 | 9/2003 | Ubowski | |
| 6,633,512 B1 | 10/2003 | Kobayashi | |
| 6,640,244 B1 | 10/2003 | Bowman-Amuah | |
| 6,651,249 B2 | 11/2003 | Waldin et al. | |
| 6,665,780 B1 | 12/2003 | Bradley | |
| 6,671,802 B1 | 12/2003 | Ott | |
| 6,728,711 B2 | 4/2004 | Richard | |
| 6,751,753 B2 | 6/2004 | Nguyen | |
| 6,766,314 B2 | 7/2004 | Burnett | |
| 6,771,826 B2 | 8/2004 | Boon | |
| 6,772,302 B1 | 8/2004 | Thompson | |
| 6,791,982 B2 | 9/2004 | Westberg | |
| 6,799,206 B1 | 9/2004 | Workman | |
| 6,819,271 B2 | 11/2004 | Geiger et al. | |
| 6,842,777 B1 | 1/2005 | Tuli | |
| 6,865,598 B2 | 3/2005 | Watkins | |
| 6,910,071 B2 | 6/2005 | Quintero | |
| 6,925,540 B2 | 8/2005 | Hawkins | |
| 6,938,045 B2 | 8/2005 | Li et al. | |
| 6,947,604 B2 | 9/2005 | Lippincott | |
| 6,952,823 B2 | 10/2005 | Kryloff et al. | |
| 6,963,923 B1 | 11/2005 | Bennett | |
| 6,965,916 B1 | 11/2005 | Kling | |
| 6,993,686 B1 | 1/2006 | Groenendaal | |
| 7,003,554 B1 | 2/2006 | Turner et al. | |
| 7,054,912 B2 | 5/2006 | Kanai et al. | |
| 7,054,960 B1 | 5/2006 | Bezbaruah | |
| 7,058,941 B1 | 6/2006 | Venkatesan et al. | |
| 7,096,392 B2 | 8/2006 | Sim-Tang | |
| 7,099,884 B2 | 8/2006 | Gu | |
| 7,158,972 B2 | 1/2007 | Marsland | |
| 7,174,479 B2 | 2/2007 | Kutan | |
| 7,178,140 B2 | 2/2007 | Dmitriev | |
| 7,191,441 B2* | 3/2007 | Abbott et al. | |
| 7,281,124 B2* | 10/2007 | Rothman et al. | |
| 7,299,360 B2 | 11/2007 | Russo | |
| 7,299,376 B2* | 11/2007 | Kodi | |
| 7,310,654 B2* | 12/2007 | McNeil | |
| 7,318,073 B2* | 1/2008 | Shields et al. | |
| 7,334,023 B2* | 2/2008 | Koba et al. | |
| 7,353,355 B1* | 4/2008 | Tormasov et al. | |
| 7,356,679 B1* | 4/2008 | Le et al. | |
| 7,360,093 B2* | 4/2008 | de Queiroz | |
| 7,362,758 B2* | 4/2008 | Chang et al. | |
| 7,363,538 B1* | 4/2008 | Kundu | |
| 7,370,120 B2* | 5/2008 | Kirsch et al. | |
| 7,461,319 B2* | 12/2008 | Hanam et al. | |
| 7,477,166 B2* | 1/2009 | McCanne et al. | |
| 7,487,169 B2* | 2/2009 | Agarwal | |
| 7,519,635 B1 | 4/2009 | Haustein et al. | |
| 7,523,098 B2 | 4/2009 | Hirsch et al. | |
| 7,523,348 B2* | 4/2009 | Anand | |
| 7,555,531 B2* | 6/2009 | Teodosiu et al. | 709/217 |
| 7,574,459 B2* | 8/2009 | Sen | |
| 7,613,787 B2* | 11/2009 | Manasse et al. | 709/217 |
| 7,756,833 B2* | 7/2010 | Van Ingen et al. | 707/640 |
| 7,849,462 B2* | 12/2010 | Traut et al. | 718/1 |
| 2002/0010702 A1 | 1/2002 | Ajtai et al. | |
| 2002/0015336 A1 | 2/2002 | Watkins | |
| 2002/0083182 A1* | 6/2002 | Alvarado et al. | |
| 2002/0107877 A1* | 8/2002 | Whiting et al. | |
| 2002/0147733 A1* | 10/2002 | Gold | |
| 2002/0152219 A1 | 10/2002 | Singh | |
| 2002/0169867 A1* | 11/2002 | Mann | |
| 2002/0199040 A1* | 12/2002 | Irwin | |
| 2003/0005102 A1* | 1/2003 | Russell | |
| 2003/0018657 A1* | 1/2003 | Monday | |
| 2003/0028736 A1* | 2/2003 | Berkowitz | |
| 2003/0028867 A1 | 2/2003 | Kryloff et al. | |
| 2003/0033344 A1* | 2/2003 | Abbott et al. | |
| 2003/0046415 A1* | 3/2003 | Kaijyu et al. | |
| 2003/0061287 A1* | 3/2003 | Yu et al. | |
| 2003/0110296 A1 | 6/2003 | Kirsch et al. | |
| 2003/0120772 A1* | 6/2003 | Husain | |
| 2003/0120920 A1* | 6/2003 | Svensson | |
| 2003/0133616 A1 | 7/2003 | Lippincott | |
| 2003/0140050 A1* | 7/2003 | Li et al. | |
| 2003/0154220 A1* | 8/2003 | Cannon | |
| 2003/0163506 A1* | 8/2003 | Dmitriev | |
| 2003/0167287 A1* | 9/2003 | Forester | |
| 2003/0167419 A1* | 9/2003 | Yanai | |
| 2003/0177485 A1 | 9/2003 | Waldin et al. | |
| 2003/0187960 A1 | 10/2003 | Koba et al. | |
| 2003/0217033 A1* | 11/2003 | Sandler | |
| 2003/0217083 A1* | 11/2003 | Taylor | |
| 2003/0225800 A1 | 12/2003 | Kavuri | |
| 2004/0012808 A1* | 1/2004 | Payne | |
| 2004/0015697 A1 | 1/2004 | de Queiroz | |
| 2004/0039716 A1 | 2/2004 | Thompson | |
| 2004/0054700 A1 | 3/2004 | Okada | |
| 2004/0093555 A1* | 5/2004 | Therrien | |
| 2004/0098637 A1* | 5/2004 | Duncan | |
| 2004/0133606 A1* | 7/2004 | Miloushev | |
| 2004/0133607 A1* | 7/2004 | Miloushev | |
| 2004/0153458 A1* | 8/2004 | Noble | |
| 2004/0199815 A1* | 10/2004 | Dinker | |
| 2004/0230377 A1* | 11/2004 | Ghosh | |
| 2004/0260973 A1* | 12/2004 | Michelman | |
| 2004/0267836 A1* | 12/2004 | Armangau et al. | |
| 2005/0004979 A1* | 1/2005 | Berkowitz | |
| 2005/0010593 A1* | 1/2005 | Fellenstein et al. | |
| 2005/0015685 A1* | 1/2005 | Yamamoto | |
| 2005/0055578 A1* | 3/2005 | Wright | |
| 2005/0071390 A1* | 3/2005 | Midgley et al. | |
| 2005/0091247 A1* | 4/2005 | Berkowitz | |
| 2005/0114363 A1* | 5/2005 | Borthakur | |
| 2005/0131939 A1 | 6/2005 | Douglis et al. | |
| 2005/0160118 A1* | 7/2005 | Berkowitz | |
| 2005/0165868 A1* | 7/2005 | Prakash | |
| 2005/0198303 A1* | 9/2005 | Knauerhase et al. | |
| 2005/0216633 A1* | 9/2005 | Cavallo | |
| 2005/0228836 A1* | 10/2005 | Bacastow et al. | |
| 2005/0235043 A1* | 10/2005 | Teodosiu et al. | |
| 2005/0256826 A1* | 11/2005 | Hambrick | |
| 2005/0256974 A1 | 11/2005 | Teodosiu et al. | |
| 2005/0262167 A1 | 11/2005 | Teodosiu et al. | |
| 2006/0031547 A1 | 2/2006 | Tsui et al. | |
| 2006/0041761 A1* | 2/2006 | Neumann et al. | |
| 2006/0047716 A1* | 3/2006 | Keith | |
| 2006/0047720 A1* | 3/2006 | Kulkari | |
| 2006/0047855 A1 | 3/2006 | Gurevich et al. | |
| 2006/0053088 A1* | 3/2006 | Ali | |
| 2006/0053178 A1* | 3/2006 | van Ingen | |
| 2006/0053181 A1* | 3/2006 | Anand | |
| 2006/0053214 A1* | 3/2006 | Riedle | |
| 2006/0064444 A1 | 3/2006 | Van Ingen et al. | |
| 2006/0085561 A1* | 4/2006 | Manasse et al. | 709/247 |
| 2006/0112113 A1 | 5/2006 | Gu et al. | |
| 2006/0150001 A1 | 7/2006 | Eguchi | |
| 2006/0155674 A1* | 7/2006 | Traut | |

| | | | |
|---|---|---|---|
| 2006/0155735 | A1* | 7/2006 | Traut et al. |
| 2006/0184652 | A1 | 8/2006 | Teodosiu et al. |
| 2006/0218435 | A1* | 9/2006 | van Ingen |
| 2006/0259526 | A1* | 11/2006 | Booz |
| 2007/0094348 | A1* | 4/2007 | Scheidel et al. |
| 2007/0162521 | A1* | 7/2007 | Raghunath |
| 2007/0180490 | A1* | 8/2007 | Renzi |
| 2009/0113241 | A1* | 4/2009 | van Ingen |
| 2009/0216798 | A1* | 8/2009 | Wahlert |
| 2009/0271528 | A1 | 10/2009 | Gurevich |

FOREIGN PATENT DOCUMENTS

| | | |
|---|---|---|
| EP | 1 641 219 A2 | 3/2006 |
| JP | 11-259387 | 9/1999 |
| JP | 2000-137594 | 5/2000 |
| JP | 10-0922674 | 10/2009 |
| RU | 2192039 | 10/2002 |
| TW | 508929 | 11/2002 |
| TW | 510107 | 11/2002 |
| TW | 511021 | 11/2002 |
| TW | 514810 | 12/2002 |
| TW | 533723 | 5/2003 |
| TW | 550490 | 9/2003 |
| TW | 580656 | 3/2004 |
| WO | WO 98/27483 | 6/1998 |
| WO | WO 98/35306 | 8/1998 |
| WO | WO 99/27460 | 6/1999 |
| WO | WO 01/54370 | 7/2001 |
| WO | WO 02/19653 | 3/2002 |
| WO | WO 02/41147 | 5/2002 |

OTHER PUBLICATIONS

Ajtai et al.; "Compactly Encoding: Unstructured Inputs with Differential Compression"; Journal of ACM, vol. 49, No. 3, May 2002; pp. 318-367.
Bjøner et al., "Content-Dependent Chunking for Differential Compression, The Local Maxim Approach," TR-2007-102; 93 pgs.
Broder, Identifying and Filtering Near-Duplicate Documents, Combinatorial Pattern Matching, 11th Annual Symposium, CPM 2000, Montreal, Canada, Jun. 21-23, 2000 Proceedings, Springer, (10 pgs).
Broder, "On the resemblance and containment of documents," IEEE, 1997 Proceedings on Compression and Complexity of Sequences Conference Jun. 11-13, 1997 (11 pgs.).
Burns et al.; "A Linear Time, Constant Space Differencing Algorithm"; 8 pgs.
Burns et al., "Efficient Distributed Backup with Delta Compression"; Proceedings of the Fifth Workshop on I/O in Parallel and Distributed 1997; pp. 27-36.
Burns; "Differential Compression: A Generalized Solution for Binary Files"; Dec. 1996; 69 pgs.
Chang, et al., Mimic: Raw Activity Shipping for File Synchronization in Mobile File Systems, 2004 ACM, pp. 165-176.
Chien, Jet Propulsion Laboratory, Gratch, Beckman Institute, "Producing satisfactory solutions to Scheduling problems: An Iterative Constraint Relaxation Approach," 6 pgs.
Douglis, Fred; Iyengar, Arun. "Application-specific Delta-encoding via Resemblance Detection," USENIX Annual Technical Conference, 2003, [14 pages].
Eshghi, "Intrinsic References In Distributed Systems," Hewlett-Packard Company, 2002, pp. 1-8.
Fisher, "Iterative Optimization and Simplification of Hierarchical Clusterings" TR CS95-01, pp. 1-33.
Giancarlo, et al., Combinatorial Pattern Matching, 11th Annual Symposium, CPM 2000, Springer (13 pgs.).
Hamilton et al, "Design and Implementation of a Storage Repository Using Commonality Factoring," IEEE 2003 (6 pgs).
Kotz, et al., "I/O in Parallel and Distributed Systems," Mar. 1, 1998, (last viewed Mar. 14, 2007) pp. 1-29, http://72.14.253.104/search?q=cache:OZiK_nQxc2sJ:www/cs/dart,pitj/edi/~dfk/papers.
Kotz, "I/O in Parallel and Distributed Systems"; Department of Computer Science, Dartmouth College, 10 pgs.
Kulkarni, et al., "Redundancy Elimination Within Large Collection of Files," USENIX Association, 2004, pp. 59-72.
Langford, "Multiround Rsync," Jan. 31, 2001, p. 1-11.
Manber, "Finding Similar Files in a Large File System," University of Arizona Technical report; TR-93-33, 11 pgs.
Miyashita, Kazuo, Electrotechnical Laboratory, and Sycara, Katia, Carnegie Mellon University, "Improving System Performance in Case-Based Iterative Optimization through Knowledge Filtering," 6 pp.
Muthitacharoen et al., "A low-bandwidth network file system," Proceedings of the eighteenth ACM symposium on Operating systems principles, 2001, pp. 174-187.
Muthitacharoen, et. al., Low-Bandwidth File System (LBFS), http://pdos.csail.mit.edu/papers/lbfs:sosp01/lbfs.pdf; 2 pgs.
Rivest, R., "The MD4 Message-Digest Algorithm," MIT Laboratory for Computer Science and RSA Data Security, Inc., Apr. 1992, Network Working Group, RFC 1320, 20 pp.
Samba documentation http://rsync.samba.org/documentation.html; 1 pg.
Spring, Neil T.; Wetherall, David. "A protocol-independent technique for eliminating redundant network traffic," Proceedings of the conference on Applications, Technologies, Architectures, and Protocols for Computer Communication; 2000, pp. 87-95.
Suel et al.; "Improved File Synchronization Techniques for Maintaining Large Replicated Collections over Slow Networks," In Proceedings: IEEE 20 International Conference on Data Engineering, Mar. 30, 2004-Apr. 2, 2004, pp. 153 to 164, available from Massey University in 2004.
Suel et al., "Algorithms for Delta Compression and Remote File Synchronization," {suel,memon}@poly.edu Academic Press, Aug. 2002, 24 pgs.
Teodosiu, Dan; Gjorner Nikolaj; Gurevich , Yuri; Manasse, Mark; and Porka, Joe, "Optimizing File Replication over Limited-Bandwidth Networks using Remote Differential Compression," pp. 1-16.
Tridgell; "The Rsync Algorithm", http://olstrans.sourceforge.net/release/OLS2000-rsync/OLS2000-rsync.html; Jul. 21, 2000; 27 pgs.
Tridgell et al.; "The Rsync Algorithm", http://www.infoscience.co.jp/technical/rsync/tech_report/index.html; Nov. 9, 1998; 1 pg.
Tridgell; Efficient Algorithms for Sorting and Synchronization; Feb. 1999; 115 pgs.
Tridgell et al.; "The Rsync Algorithm", The Australian National University; TR-CS-96-05; Jun. 1996; 8 pgs.
Tridgell; "The Rsync Algorithm", Nov. 9, 1998 (last viewed Oct. 11, 2006); http://www.infoscience.co.jp/technical/rsynch/tech_report/index.html; 10 pgs.
New Zealand Examination Report dated Mar. 15, 2005, Application No. 538839.
European Search Report dated Nov. 3, 2006, Application No. 05108288.1-1225.
European Search Report dated Mar. 2, 2007, Application No. 05102664.9-1225.
Philippine Office Action dated Nov. 14, 2007, Application No. 1-2005-000140.
Chinese Office Action dated Aug. 1, 2008, Application No. 200510108958.3.
Russian Office Action dated Apr. 13, 2009, Application No. 2005105759.
Chinese Office Action dated Jul. 24, 2009, Application No. 200510055107.7.
EP Examination Report dated Dec. 4, 2009, Application No. 05 102 664.9.
Chinese 2nd Office Action dated Aug. 24, 2010, Application No. 200510055107.7.
U.S. Official Action dated Nov. 14, 2006 in U.S. Appl. No. 10/844,907.
U.S. Official Action dated May 18, 2007 in U.S. Appl. No. 10/844,907.
U.S. Official Action dated Sep. 3, 2008 in U.S. Appl. No. 10/948,980.
U.S. Official Action dated Feb. 2, 2010 in U.S. Appl. No. 10/844,893.
"How Do the 'Verify' and 'Write Checksums to Media' Processes Work and Why are They Necessary?"; Veritas Software; Sep. 29, 2004; http://seer.support.veritas.com/docs/24517.htm; Retrieved May 6, 2005; 6 pgs.

"Ultrabac: Overview"; Raxco Software Europe; n.d.; http://www.raxco.co.uk/product.asp?ProductID=100; Retrieved May 6, 2005, 3 pgs.

"Vertitas™ NetBackup & Data Domain DD200 Restorer: Highly Reliable, High-Performance Disk-Based Data Protection at the Cost of Tape"; Copyright 2004 Veritas Software Corporation; http://www.datadomain.com/pdf/Veritas-NetBackup-and-DataDomainDD200.pdf; Retrieved May 6, 2005, 20 pgs.

3wGet-Powerful HTTP/FTP Download Manager and Websites Downloader, http://www.popularshareware.com/3wGet-download-9099.ht20060085561m1, 2 pages.

ActiveFile, http://www.15seconds.com/component/pg000024.htm, 2006, 4 pages.

Advisory Action dated Sep. 12, 2008 issued in U.S. Appl. No. 11/090,586, 3 pages.

Amendment after Notice of Allowance dated Nov. 24, 2009 filed in U.S. Appl. No. 11/031,133, 6 pages.

Appeal Brief dated Nov. 15, 2010 filed in U.S. Appl. No. 11/090,586, 15 pages.

Australian Examiner's first report dated Jan. 22, 2010 regarding Application No. 2005201386, 1 page.

Australian Notice of Allowance; AU Application 2005201386, mailed Jun. 2, 2010, 3 pgs.

Broder, A.Z., "Identifying and Filtering Near-Duplicate Documents", Sequences 1997, 10 pages.

Chinese Notice of Allowance dated Jan. 8, 2010, Application No. 200510108958.3, 2 pgs.

Chinese Notice of Allowance dated Mar. 18, 2011, Application No. 200510055107.7, 4 pgs.

Decision on Petition to Withdraw from Issue dated Jun. 24, 2010 issued in U.S. Appl. No. 11/031,133, 2 pages.

Decision on Pre-Brief Conference Request dated Oct. 15, 2010 filed in U.S. Appl. No. 11/090,586, 2 pages.

European communication from the Examining Division dated Aug. 27, 2007 regarding EP Application No. 05108288.1, 1 page.

European Response to Communication from the Examining Division dated Feb. 11, 2008 regarding EP Application No. 05108288.1, 17 pages.

Examiner's Answer to Appeal Brief dated Dec. 7, 2010 filed in U.S. Appl. No. 11/090,586, 21 pages.

File2Pack 2.0, Mental9Production, Dec. 24, 2005, http://www.freedomloadmanager.org/downloads/archiving software, 4 pages.

Israeli Office Action dated Jul. 12, 2009 Application No. 167467, 2 pages.

Japanese Notice of Rejection dated Apr. 15, 2011, Application No. 2005-277831, 7 pgs.

Japanese Notice of Rejection dated Dec. 14, 2010, Application No. 2005-073985, 8 pages.

Japanese Patent Application No. 2005-073985, Notice of Allowance mailed Jul. 22, 2011, 6 pgs.

Kozuch et al., "Efficient State Transfer for Internet Suspend/Resume," May 2002, p. 5 Pure-Demand fetch, 12 pages.

Mexican Notice of Allowance; Application No. PAa2005002949, mailed Jul. 9, 2010, 2 pgs.

Notice of Allowance dated Aug. 8, 2011 issued in U.S. Appl. No. 11/031,133, 7 pages.

Notice of Allowance dated Oct. 13, 2009 issued in U.S. Appl. No. 11/031,133, 13 pages.

Notice of Allowance dated Sep. 24, 2009 in U.S. Appl. No. 10/937,204, 6 pages.

Office Action dated Apr. 17, 2008 in U.S. Appl. No. 10/937,060, 18 pages.

Office Action dated Apr. 26, 2010 in U.S. Appl. No. 10/937,061, 32 pages.

Office Action dated Apr. 3, 2009 issued in U.S. Appl. No. 11/031,133, 9 pages.

Office Action dated Apr. 9, 2008 issued in U.S. Appl. No. 11/031,133, 11 pages.

Office Action dated Aug. 10, 2007 issued in U.S. Appl. No. 11/090,586, 5 pages.

Office Action dated Dec. 10, 2007 in U.S. Appl. No. 10/937,204, 12 pages.

Office Action dated Feb. 18, 2011 issued in U.S. Appl. No. 11/031,133, 10 pages.

Office Action dated Feb. 19, 2009 issued in U.S. Appl. No. 11/090,586, 13 pages.

Office Action dated Jun. 25, 2008 in U.S. Appl. No. 10/937,204, 14 pages.

Office Action dated Jun. 8, 2010 issued in U.S. Appl. No. 11/544,485, 12 pages.

Office Action dated Mar. 11, 2009 in U.S. Appl. No. 10/937,204, 8 pages.

Office Action dated Mar. 11, 2010 issued in U.S. Appl. No. 11/090,586, 23 pages.

Office Action dated Mar. 19, 2009 in U.S. Appl. No. 10/937,060, 20 pages.

Office Action dated May 29, 2008 issued in U.S. Appl. No. 11/090,586, 17 pages.

Office Action dated Nov. 1, 2007 in U.S. Appl. No. 10/937,060, 12 pages.

Office Action dated Nov. 12, 2009 in U.S. Appl. No. 10/937,060, 21 pages.

Office Action dated Nov. 25, 2009 issued in U.S. Appl. No. 11/090,586, 17 pages.

Office Action dated Oct. 15, 2008 issued in U.S. Appl. No. 11/031,133, 10 pages.

Office Action dated Oct. 2, 2007 issued in U.S. Appl. No. 11/090,586, 11 pages.

Office Action dated Oct. 9, 2008 in U.S. Appl. No. 10/937,060, 17 pages.

Petition to Withdraw from Issue dated Jun. 21, 2010 issued in U.S. Appl. No. 11/031,133, 9 pages.

Philippine Official Action dated Oct. 6, 2009 regarding Application No. 1-2005-000140, 2 pages.

Pre-Brief Conference Request dated Sep. 13, 2010 filed in U.S. Appl. No. 11/090,586, 5 pages.

Reply Brief dated Feb. 7, 2011 filed in U.S. Appl. No. 11/090,586, 9 pages.

Response to Amendment after Notice of Allowance dated Dec. 16, 2009 issued in U.S. Appl. No. 11/031,133, 2 pages.

Response to Office Action dated Aug. 29, 2008 filed in U.S. Appl. No. 11/090,586, 13 pages.

Response to Office Action dated Aug. 18, 2009 filed in U.S. Appl. No. 11/090,586, 11 pages.

Response to Office Action dated Feb. 1, 2008 filed in U.S. Appl. No. 11/090,586, 13 pages.

Response to Office Action dated Feb. 25, 2010 filed in U.S. Appl. No. 11/090,586, 10 pages.

Response to Office Action dated Jul. 6, 2009 filed in U.S. Appl. No. 11/031,133, 8 pages.

Response to Office Action dated Jul. 9, 2008 filed in U.S. Appl. No. 11/031,133, 9 pages.

Response to Office Action dated May 18, 2011 issued in U.S. Appl. No. 11/031,133, 11 pages.

Response to Office Action dated Sep. 10, 2007 filed in U.S. Appl. No. 11/090,586, 1 pages.

Response to Office Action dated Sep. 19, 2008 filed in U.S. Appl. No. 10/948,980, 11 pages.

Russian Application No. 2005105759, Notice of Allowance mailed Aug. 28, 2009, 11 pgs.

Script Utilities and Huge ASP File Upload, http://www.motobit.com/help/aspupload/upload.asp, 1996-2006, 5 pages.

Taiwan Application No. 94107741 Office Action and Search Report mailed Jul. 5, 2011, 2 pgs.

U.S. Appl. No. 10/825,735, filed Apr. 15, 2004, Amendment and Response filed Feb. 23, 2009, 3 pgs.

U.S. Appl. No. 10/825,735, filed Apr. 15, 2004, Amendment and Response filed Feb. 25, 2009, 2 pgs.

U.S. Appl. No. 10/825,735, filed Apr. 15, 2004, Notice of Allowance mailed Dec. 16, 2008, 17 pgs.

U.S. Appl. No. 10/948,980, Notice of Allowance mailed Oct. 15, 2008, 6 pgs.

U.S. Appl. No. 10/948,980, Notice of Allowance mailed Apr. 17, 2009, 5 pgs.

U.S. Appl. No. 12/431,483, Notice of Allowance mailed Mar. 31, 2011, 11 pgs.
U.S. Appl. No. 12/431,483, Notice of Allowance mailed Apr. 11, 2011, 10 pgs.
U.S. Appl. No. 12/431,483, Notice of Allowance mailed Jul. 25, 2011, 11 pgs.
U.S. Appl. No. 10/844,907, Amendment and Response filed Nov. 16, 2007, 19 pgs.
U.S. Appl. No. 10/844,907, Amendment and Response filed Feb. 14, 2007, 17 pgs.
U.S. Appl. No. 11/031,158, Advisory Action mailed Jul. 9, 2008, 3 pgs.
U.S. Appl. No. 11/031,158, Amendment after Final filed Jun. 17, 2008, 8 pgs.
U.S. Appl. No. 11/031,158, Amendment and Response filed Dec. 21, 2007, 11 pgs.
U.S. Appl. No. 11/031,158, Amendment and Response filed Apr. 5, 2010, 8 pgs.
U.S. Appl. No. 11/031,158, Amendment and Response filed Aug. 18, 2008, 7 pgs.
U.S. Appl. No. 11/031,158, Amendment and Response filed Sep. 11, 2009, 7 pgs.
U.S. Appl. No. 11/031,158, Final Office Action mailed Jan. 4, 2010, 13 pgs.
U.S. Appl. No. 11/031,158, Final Office Action mailed Mar. 17, 2008, 12 pgs.
U.S. Appl. No. 11/031,158, Notice of Allowance mailed Jul. 30, 2010, 11 pgs.
U.S. Appl. No. 11/031,158, Office Action mailed Jun. 19, 2009, 12 pgs.
U.S. Appl. No. 11/031,158, Office Action mailed Aug. 29, 2007, 9 pgs.
Chinese 1st Office Action in Application 2011101507683, mailed Nov. 16, 2011, 6 pgs.
Japanese Final Rejection in Application 2005-277831 mailed Sep. 22, 2011, 4 pgs.
Malaysian Notice of Allowance in Application PI20051086 mailed Oct. 31, 2011, 2 pgs.
Taiwan Notice of Allowance in Application 94107741, mailed Nov. 21, 2011, 4 pgs.
U.S. Appl. No. 11/031,133, Amendment and Response filed Sep. 15, 2011, 3 pgs.
U.S. Appl. No. 12/431,483, Notice of Allowance mailed Oct. 27, 2011, 10 pgs.

* cited by examiner

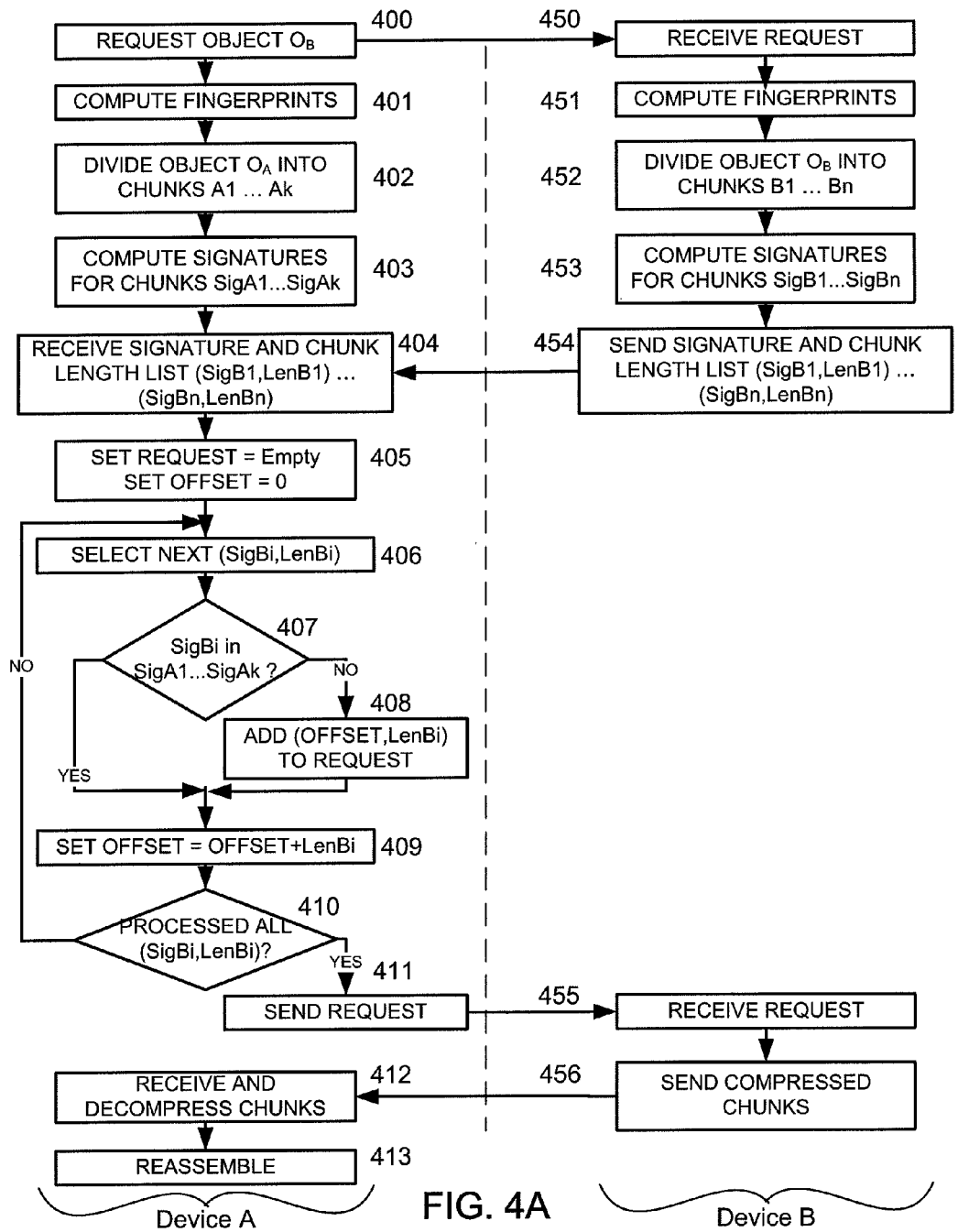

```
structure Entry
    var isMax  as Boolean = false
    var hash   as Integer = 0
    var offset as Integer = 0 class LocalMaxCut
    h as Integer
    var min as Integer = 0
    var max as Integer = 0
    var M as Array of entry = new Entry[h]

CutPoint(hash as Integer, offset as Integer) as Boolean
        var result = false
        step
            if M[max].offset + h + 1 = offset then
                result := M[max].isMax
                max := (max+1) mod h
        step
            while true do step
                step
                    if M[min].hash > hash then
                        step
                            min := (min-1) mod h
                        step
                            M[min] := Entry(false, hash, offset)
                            return result
                    if M[min].hash = hash then
                        M[min] := Entry(false, hash, offset)
                        return result
                    if M[min].hash < hash and min = max then
                        M[min] := Entry(true, hash, offset)
                        return result
                step
```

FIG. 9

```
structure Entry
  var offset as Integer = 0
  var isMax  as Boolean = false
  var hash   as Integer = 0 class LocalMaxCut
  horizon as Integer
  var hashes as Seq of Integer
  var k as Integer = 0
  var l as Integer = 0
  var A as Array of Entry = new Entry[horizon]
  var B as Array of Entry = new Entry[horizon]

CutPoints() as Seq of Integer
    var cuts as Seq of Integer = []
    for window = 0 to Length(hashes)/horizon do step
      let first = window*horizon
      let last = min((window+1)*horizon,Length(hashes)))-1
      cuts := cuts + CutPoint(first, last)
    return cuts CutPoint(first as Integer, last as Integer) as Seq of Integer
    step // Initialize A with the first entry at the offset
      k := 0
      A[0] := Entry(last,true,hashes[last])
      last := last - 1
    step // Update A[k] in the interval up to B[l]'s horizon
      while last > B[l].offset + horizon do step
        Insert(last)
        last := last - 1
    step // Update A[k] and B[l] in the remaining interval
      while last >= first do step
        Insert(last)
        if B[l].hash <= hashes[last] then
          B[l].isMax := false
        last := last -1
    step // determine whether A[k] is a cutpoint with respect to B
      A[k].isMax := A[k].isMax and
                    forall j in {0..l} holds
                      (B[j].offset + horizon < A[k].offset or
                       B[j].hash < A[k].hash)
    step // Set B to A for the next round and return cut-point
      B, l := A, k
      return if B[l].isMax then [B[l].offset] else []
```

FIG. 10

```
class LocalMaxCut
  Insert(offset as Integer)
    if hashes[offset] >= A[k].hash then
      if hashes[offset] = A[k].hash then
        // duplicated hashes within distance
        // of "horizon" are not maximal.
        A[k].isMax := false
      else
        A[k+1] := Entry(offset, true, hashes[offset])
        k := k + 1
```

FIG. 11

EFFICIENT ALGORITHM FOR FINDING CANDIDATE OBJECTS FOR REMOTE DIFFERENTIAL COMPRESSION

RELATED APPLICATIONS

This application is a continuation of prior U.S. application Ser. No. 10/948,980, filed on Sep. 24, 2004, now U.S. Pat. No. 7,613,787 which is hereby incorporated by reference.

BACKGROUND OF THE INVENTION

The proliferation of networks such as intranets, extranets, and the internet has lead to a large growth in the number of users that share information across wide networks. A maximum data transfer rate is associated with each physical network based on the bandwidth associated with the transmission medium as well as other infrastructure related limitations. As a result of limited network bandwidth, users can experience long delays in retrieving and transferring large amounts of data across the network.

Data compression techniques have become a popular way to transfer large amounts of data across a network with limited bandwidth. Data compression can be generally characterized as either lossless or lossy. Lossless compression involves the transformation of a data set such that an exact reproduction of the data set can be retrieved by applying a decompression transformation. Lossless compression is most often used to compact data, when an exact replica is required.

In the case where the recipient of a data object already has a previous, or older, version of that object, a lossless compression approach called Remote Differential Compression (RDC) may be used to determine and only transfer the differences between the new and the old versions of the object. Since an RDC transfer only involves communicating the observed differences between the new and old versions (for instance, in the case of files, file modification or last access dates, file attributes, or small changes to the file contents), the total amount of data transferred can be greatly reduced. RDC can be combined with another lossless compression algorithm to further reduce the network traffic. The benefits of RDC are most significant in the case where large objects need to be communicated frequently back and forth between computing devices and it is difficult or infeasible to maintain old copies of these objects, so that local differential algorithms cannot be used.

SUMMARY OF THE INVENTION

Briefly stated, the present invention is related to a method and system for finding candidate objects for remote differential compression. Objects are updated between two or more computing devices using remote differential compression (RDC) techniques such that required data transfers are minimized. In one aspect, an algorithm provides enhanced efficiencies by allowing the sender to communicate a small amount of meta-data to the receiver, and the receiver to use this meta-data to locate a set of objects that are similar to the object that needs to be transferred from the sender. Once this set of similar objects has been found, the receiver may reuse any parts of these objects as needed during the RDC algorithm.

A more complete appreciation of the present invention and its improvements can be obtained by reference to the accompanying drawings, which are briefly summarized below, to the following detailed description of illustrative embodiments of the invention, and to the appended claims.

BRIEF DESCRIPTION OF THE DRAWINGS

Non-limiting and non-exhaustive embodiments of the present invention are described with reference to the following drawings.

FIGS. 4A and 4B are diagrams illustrating process flows for the interaction between a local device and a remote device during an example RDC procedure;

FIG. 9 is a diagram of example instruction code for an example chunking procedure;

FIGS. 10 and 11 are diagrams of example instruction code for another example chunking procedure;

DETAILED DESCRIPTION OF THE PREFERRED EMBODIMENT

Figure 1:
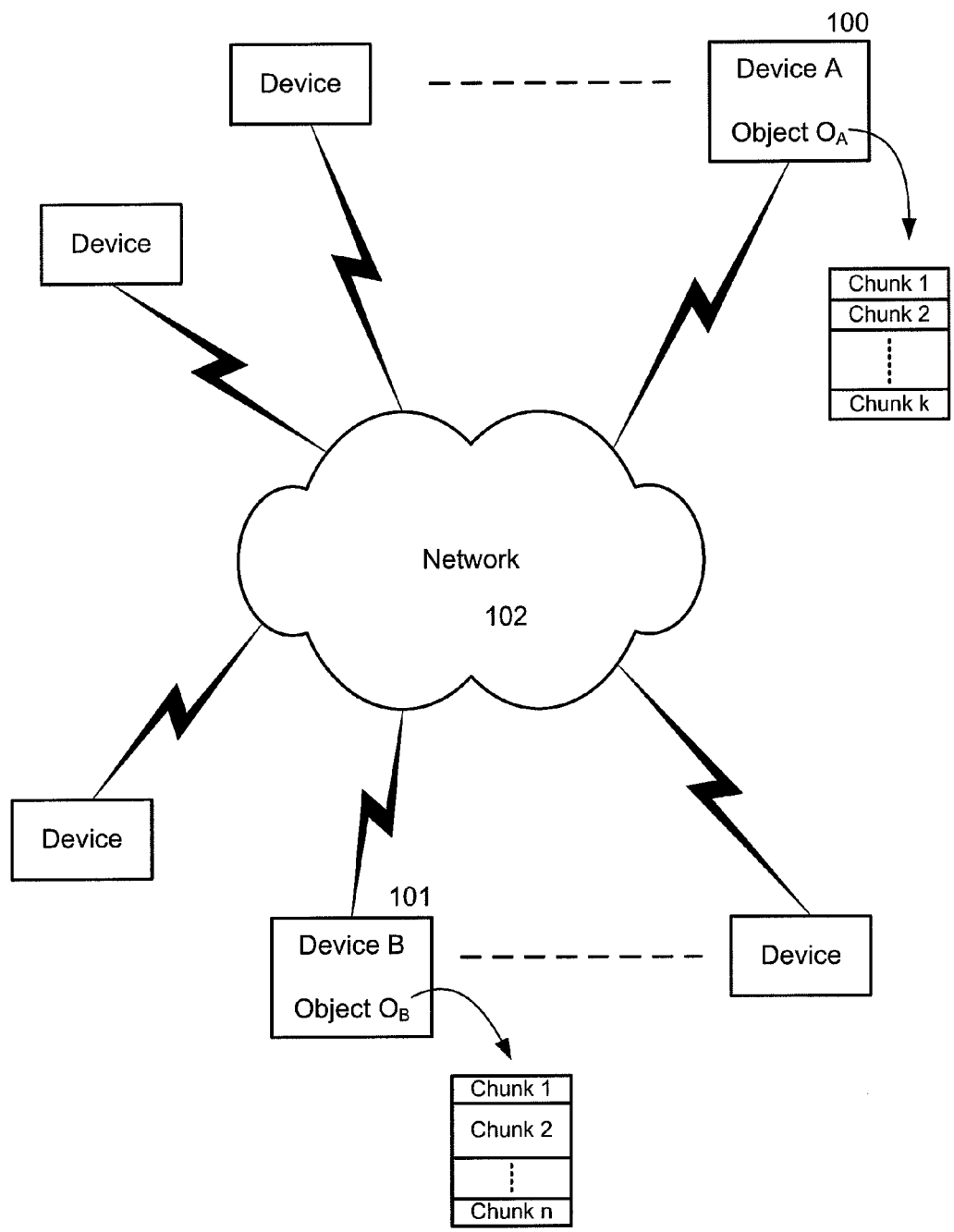
FIG. 1 is a diagram illustrating an operating environment.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The present invention is described in the context of local and remote computing devices (or "devices", for short) that have one or more commonly associated objects stored thereon. The terms "local" and "remote" refer to one instance of the method. However, the same device may play both a "local" and a "remote" role in different instances. Remote Differential Compression (RDC) methods are used to efficiently update the commonly associated objects over a network with limited-bandwidth. When a device having a new copy of an object needs to update a device having an older copy of the same object, or of a similar object, the RDC method is employed to only transmit the differences between the objects over the network. An example described RDC method uses (1) a recursive approach for the transmission of the RDC metadata, to reduce the amount of metadata transferred for large objects, and (2) a local maximum-based chunking method to increase the precision associated with the object differencing such that bandwidth utilization is minimized. Some example applications that benefit from the described RDC methods include: peer-to-peer replication services, file-transfer protocols such as SMB, virtual servers that transfer large images, email servers, cellular phone and PDA synchronization, database server replication, to name just a few.

Operating Environment

FIG. 1 is a diagram illustrating an example operating environment for the present invention. As illustrated in the figure, devices are arranged to communicate over a network. These devices may be general purpose computing device, special purpose computing devices, or any other appropriate devices that are connected to a network. The network 102 may correspond to any connectivity topology including, but not limited to: a direct wired connection (e.g., parallel port, serial port, USB, IEEE 1394, etc), a wireless connection (e.g., IR port, Bluetooth port, etc.), a wired network, a wireless network, a local area network, a wide area network, an ultra-wide area network, an internet, an intranet, and an extranet.

In an example interaction between device A (100) and device B (101), different versions of an object are locally stored on the two devices: object $O_A$ on 100 and object $O_B$ on 101. At some point, device A (100) decides to update its copy of object $O_A$ with the copy (object $O_B$) stored on device B (101), and sends a request to device B (101) to initiate the RDC method. In an alternate embodiment, the RDC method could be initiated by device B (101).

Device A (100) and device B (101) both process their locally stored object and divide the associated data into a variable number of chunks in a data-dependent fashion (e.g., chunks 1-n for object $O_B$, and chunks 1-k for object $O_A$, respectively). A set of signatures such as strong hashes (SHA) for the chunks are computed locally by both the devices. The devices both compile separate lists of the signatures. During the next step of the RDC method, device B (101) transmits its computed list of signatures and chunk lengths 1-n to device A (100) over the network 102. Device A (100) evaluates this list of signatures by comparing each received signature to its own generated signature list 1-k. Mismatches in the signature lists indicate one or more differences in the objects that require correction. Device A (100) transmits a request for device B (101) to send the chunks that have been identified by the mismatches in the signature lists. Device B (101) subsequently compresses and transmits the requested chunks, which are then reassembled by device A (100) after reception and decompression are accomplished. Device A (100) reassembles the received chunks together with its own matching chunks to obtain a local copy of object $O_B$.

Example Computing Device

Figure 2:
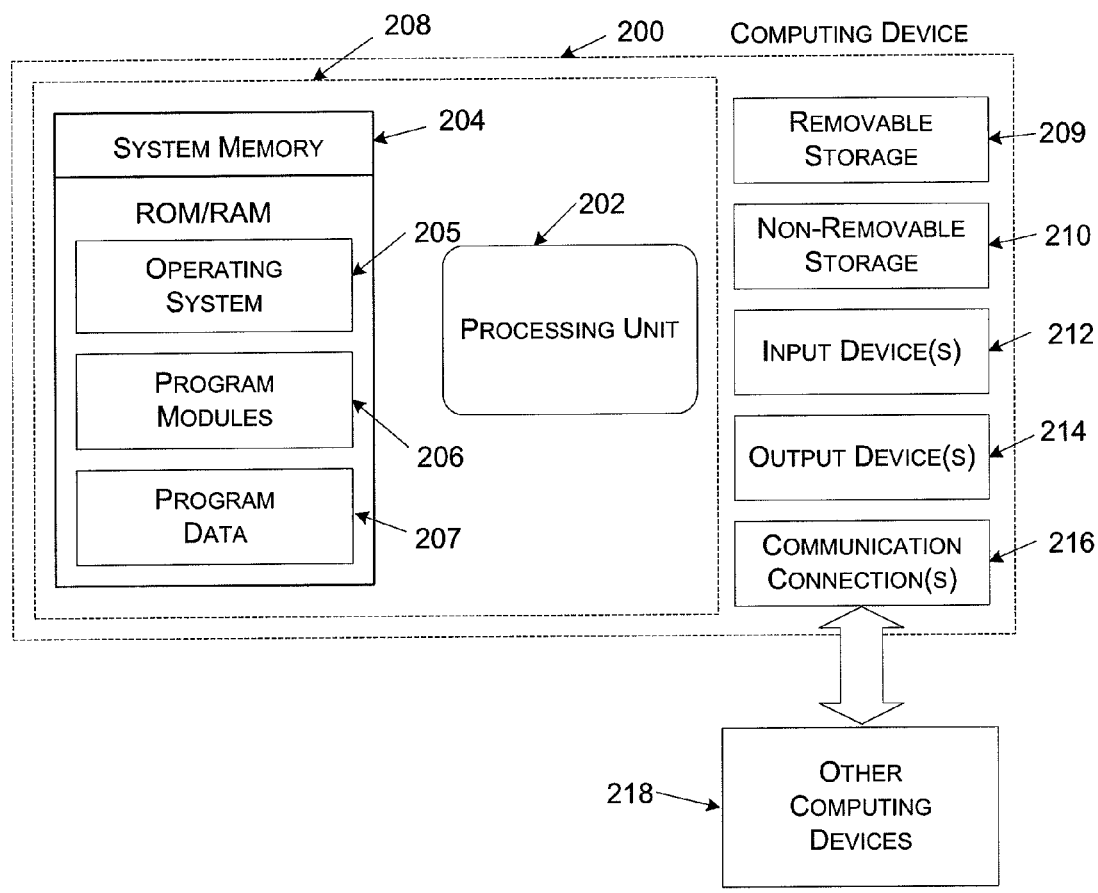
FIG. 2 is a diagram illustrating an example computing device.

FIG. 2 is a block diagram of an example computing device that is arranged in accordance with the present invention. In a basic configuration, computing device 200 typically includes at least one processing unit (202) and system memory (204). Depending on the exact configuration and type of computing device, system memory 204 may be volatile (such as RAM), non-volatile (such as ROM, flash memory, etc.) or some combination of the two. System memory 204 typically includes an operating system (205); one or more program modules (206); and may include program data (207). This basic configuration is illustrated in FIG. 2 by those components within dashed line 208.

Computing device 200 may also have additional features or functionality. For example, computing device 200 may also include additional data storage devices (removable and/or non-removable) such as, for example, magnetic disks, optical disks, or tape. Such additional storage is illustrated in FIG. 2 by removable storage 209 and non-removable storage 210. Computer storage media may include volatile and non-volatile, removable and non-removable media implemented in any method or technology for storage of information, such as computer readable instructions, data structures, program modules or other data. System memory 204, removable storage 209 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 200. Any such computer storage media may be part of device 200. Computing device 200 may also have input device(s) 212 such as keyboard, mouse, pen, voice input device, touch input device, etc. Output device(s) 214 such as a display, speakers, printer, etc. may also be included. All these devices are known in the art and need not be discussed at length here.

Computing device 200 also contains communications connection(s) 216 that allow the device to communicate with other computing devices 218, such as over a network. Communications connection(s) 216 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, microwave, satellite, infrared and other wireless media. The term computer readable media as used herein includes both storage media and communication media.

Various procedures and interfaces may be implemented in one or more application programs that reside in system memory 204. In one example, the application program is a remote differential compression algorithm that schedules file synchronization between the computing device (e.g., a client) and another remotely located computing device (e.g., a server). In another example, the application program is a compression/decompression procedure that is provided in system memory 204 for compression and decompressing data. In still another example, the application program is a decryption procedure that is provided in system memory 204 of a client device.

Remote Differential Compression (RDC)

Figure 3A:
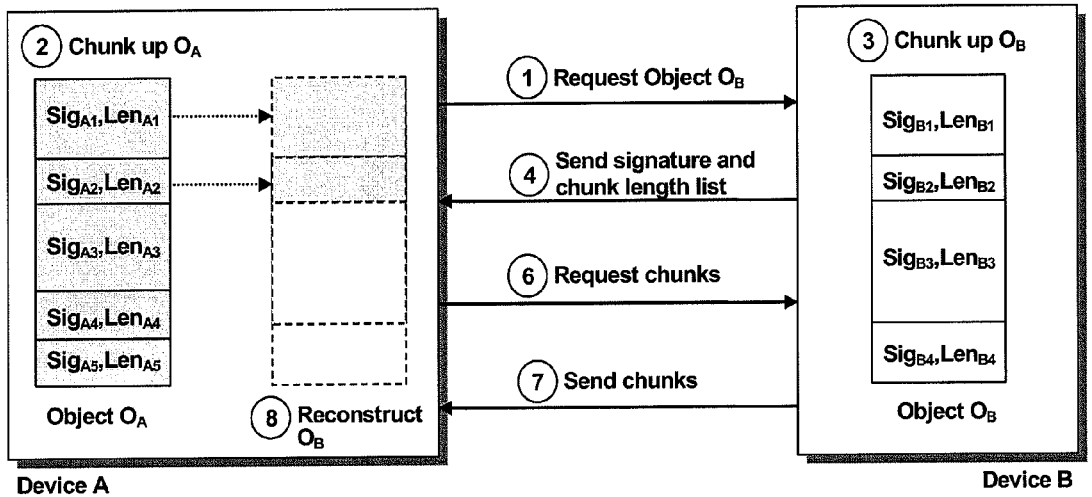
FIGS. 3A and 3B are diagrams illustrating an example RDC procedure.
Figure 3B:
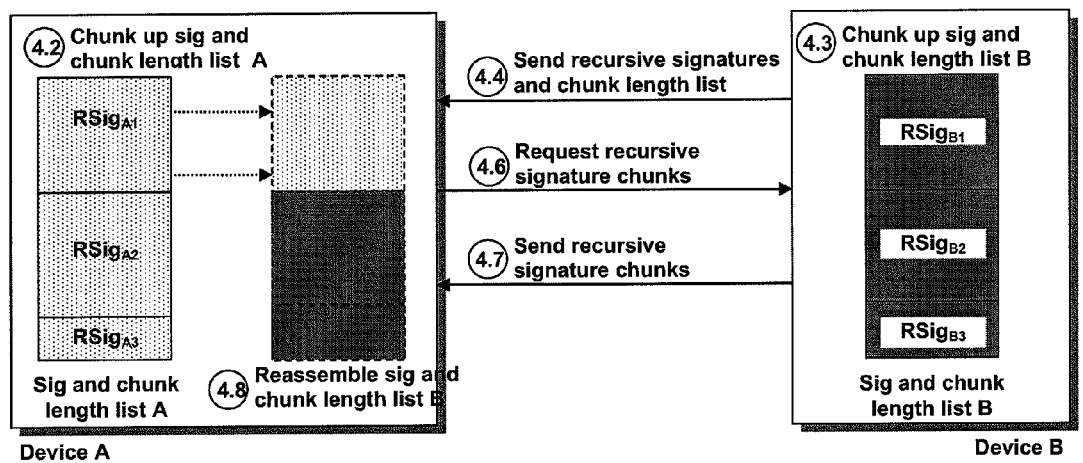

FIGS. 3A and 3B are diagrams illustrating an example RDC procedure according to at least one aspect of the present invention. The number of chunks in particular can vary for each instance depending on the actual objects $O_A$ and $O_B$.

Referring to FIG. 3A, the basic RDC protocol is negotiated between two computing devices (device A and device B). The RDC protocol assumes implicitly that the devices A and B have two different instances (or versions) of the same object or resource, which are identified by object instances (or versions) $O_A$ and $O_B$, respectively. For the example illustrated in this figure, device A has an old version of the resource $O_A$, while device B has a version $O_B$ with a slight (or incremental) difference in the content (or data) associated with the resource.

The protocol for transferring the updated object $O_B$ from device B to device A is described below. A similar protocol may be used to transfer an object from device A to device B, and that the transfer can be initiated at the behest of either device A or device B without significantly changing the protocol described below.

1. Device A sends device B a request to transfer Object $O_B$ using the RDC protocol. In an alternate embodiment, device B initiates the transfer; in this case, the protocol skips step 1 and starts at step 2 below.
2. Device A partitions Object $O_A$ into chunks 1-k, and computes a signature $Sig_{Ai}$ and a length (or size in bytes) $Len_{Ai}$ for each chunk 1 ... k of Object $O_A$. The partitioning into chunks will be described in detail below. Device A stores the list of signatures and chunk lengths $((Sig_{A1}, Len_{A1}) (Sig_{Ak}, Len_{Ak}))$.
3. Device B partitions Object $O_B$ into chunks 1-n, and computes a signature $Sig_{Bi}$ and a length $Len_{Bi}$ for each chunk 1 ... n of Object $O_B$. The partitioning algorithm used in step 3 must match the one in step 2 above.
4. Device B sends a list of its computed chunk signatures and chunk lengths $((Sig_{B1}, Len_{B1}) ... (Sig_{Bn}, Len_{Bn}))$ that are associated with Object $O_B$ to device A. The chunk length information may be subsequently used by device A to request a particular set of chunks by identifying them with their start offset and their length. Because of the sequential nature of the list, it is possible to compute the starting offset in bytes of each chunk Bi by adding up the lengths of all preceding chunks in the list.
   In another embodiment, the list of chunk signatures and chunk lengths is compactly encoded and further compressed using a lossless compression algorithm before being sent to device A.
5. Upon receipt of this data, device A compares the received signature list against the signatures $Sig_{A1}$ ... $Sig_{Ak}$ that it computed for Object $O_A$ in step 2, which is associated with the old version of the content.
6. Device A sends a request to device B for all the chunks whose signatures received in step 4 from device B failed to match any of the signatures computed by device A in step 2. For each requested chunk Bi, the request comprises the chunk start offset computed by device A in step 4 and the chunk length.
7. Device B sends the content associated with all the requested chunks to device A. The content sent by device B may be further compressed using a lossless compression algorithm before being sent to device A.
8. Device A reconstructs a local copy of Object $O_B$ by using the chunks received in step 7 from device B, as well as its own chunks of Object $O_A$ that matched signatures sent by device B in step 4. The order in which the local and remote chunks are rearranged on device A is determined by the list of chunk signatures received by device A in step 4.

The partitioning steps 2 and 3 may occur in a data-dependent fashion that uses a fingerprinting function that is computed at every byte position in the associated object ($O_A$ and $O_B$, respectively). For a given position, the fingerprinting function is computed using a small data window surrounding that position in the object; the value of the fingerprinting function depends on all the bytes of the object included in that window. The fingerprinting function can be any appropriate function, such as, for example, a hash function or a Rabin polynomial.

Chunk boundaries are determined at positions in the Object for which the fingerprinting function computes to a value that satisfies a chosen condition. The chunk signatures may be computed using a cryptographically secure hash function (SHA), or some other hash function such as a collision-resistant hash function.

The signature and chunk length list sent in step 4 provides a basis for reconstructing the object using both the original chunks and the identified updated or new chunks. The chunks that are requested in step 6 are identified by their offset and lengths. The object is reconstructed on device A by using local and remote chunks whose signatures match the ones received by device A in step 4, in the same order.

After the reconstruction step is completed by device A, Object $O_A$ can be deleted and replaced by the copy of Object $O_B$ that was reconstructed on device A. In other embodiments, device A may keep Object $O_A$ around for potential "reuse" of chunks during future RDC transfers.

For large objects, the basic RDC protocol instance illustrated in FIG. 3A incurs a significant fixed overhead in Step 4, even if Object $O_A$ and Object $O_B$ are very close, or identical. Given an average chunk size C, the amount of information transmitted over the network in Step 4 is proportional to the size of Object $O_B$, specifically it is proportional to the size of Object $O_B$ divided by C, which is the number of chunks of Object B, and thus of (chunk signature, chunk length) pairs transmitted in step 4.

Figure 6:
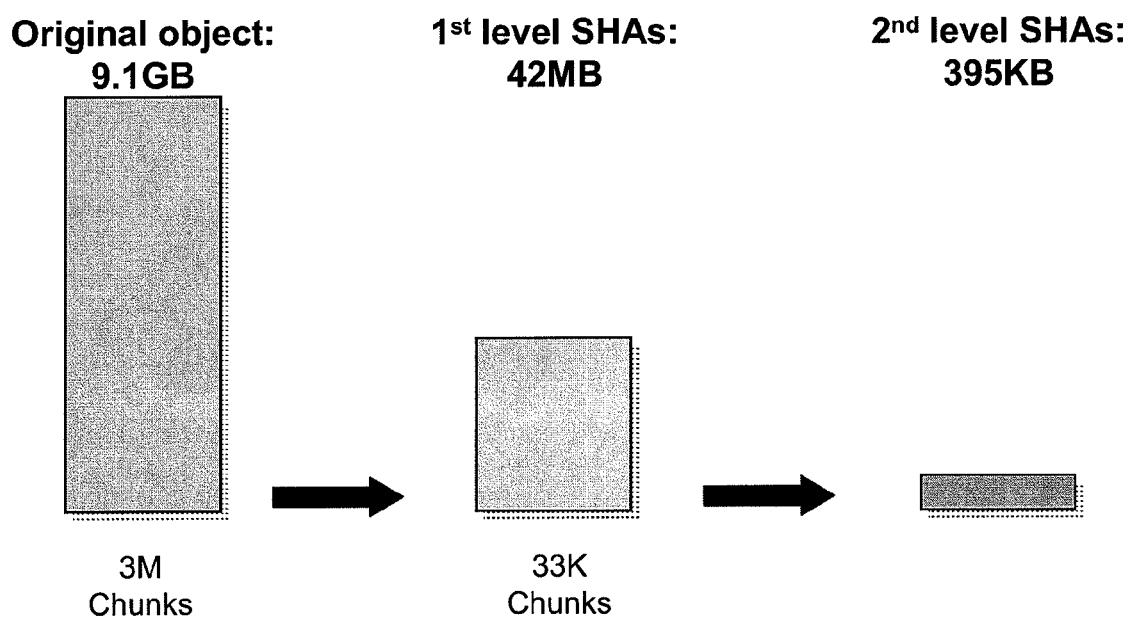
FIG. 6 is a diagram that graphically illustrates an example of recursive compression in an example RDC sequence.

For example, referring to FIG. 6, a large image (e.g., a virtual hard disk image used by a virtual machine monitor such as, for example, Microsoft Virtual Server) may result in an Object ($O_B$) with a size of 9.1 GB. For an average chunk size C equal to 3 KB, the 9 GB object may result in 3 million chunks being generated for Object $O_B$, with 42 MB of associated signature and chunk length information that needs to be sent over the network in Step 4. Since the 42 MB of signature information must be sent over the network even when the differences between Object $O_A$ and Object $O_B$ (and thus the amount of data that needs to be sent in Step 7) are very small, the fixed overhead cost of the protocol is excessively high.

This fixed overhead cost can be significantly reduced by using a recursive application of the RDC protocol instead of the signature information transfer in step 4. Referring to FIG. 3B, additional steps 4.2-4.8 are described as follows below that replace step 4 of the basic RDC algorithm. Steps 4.2-4.8 correspond to a recursive application of steps 2-8 of the basic RDC protocol described above. The recursive application can be further applied to step 4.4 below, and so on, up to any desired recursion depth.

4.2. Device A performs a recursive chunking of its signature and chunk length list $((Sig_{A1}, Len_{A1}) ... (Sig_{Ak}, Len_{Ak}))$ into recursive signature chunks, obtaining another list of recursive signatures and recursive chunk lengths $((RSig_{A1}, RLen_{A1}) ... (RSig_{As}, RLen_{As}))$, where $s \ll k$.

4.3. Device B recursively chunks up the list of signatures and chunk lengths $((Sig_{B1}, Len_{B1}) ... (Sig_{Bn}, Len_{Bn}))$ to produce a list of recursive signatures and recursive chunk lengths $((RSig_{B1}, RLen_{B1}) ... (RSig_{Br}, RLen_{Br}))$, where $r \ll n$.

4.4. Device B sends an ordered list of recursive signatures and recursive chunk lengths $((RSig_{B1}, RLen_{B1}) ... (RSig_{Br}, RLen_{Br}))$ to device A. The list of recursive chunk signatures and recursive chunk lengths is compactly encoded and may be further compressed using a lossless compression algorithm before being sent to device A.

4.5. Device A compares the recursive signatures received from device B with its own list of recursive signatures computed in Step 4.2.

4.6. Device A sends a request to device B for every distinct recursive signature chunk (with recursive signature $RSig_{Bk}$) for which device A does not have a matching recursive signature in its set ($RSig_{As} \ldots RSig_{As}$).

4.7. Device B sends device A the requested recursive signature chunks. The requested recursive signature chunks may be further compressed using a lossless compression algorithm before being sent to device A.

4.8. Device A reconstructs the list of signatures and chunk information (($Sig_{B1}$, $Len_{B1}$) ... ($Sig_{Bn}$, $Len_{Bn}$)) using the locally matching recursive signature chunks, and the recursive chunks received from device B in Step 4.7.

After step 4.8 above is completed, execution continues at step 5 of the basic RDC protocol described above, which is illustrated in FIG. 3A.

As a result of the recursive chunking operations, the number of recursive signatures associated with the objects is reduced by a factor equal to the average chunk size C, yielding a significantly smaller number of recursive signatures (r<<n for object $O_A$ and s<<k for object $O_B$, respectively). In one embodiment, the same chunking parameters could be used for chunking the signatures as for chunking the original objects $O_A$ and $O_B$. In an alternate embodiment, other chunking parameters may be used for the recursive steps.

For very large objects the above recursive steps can be applied k times, where k≧1. For an average chunk size of C, recursive chunking may reduce the size of the signature traffic over the network (steps 4.2 through 4.8) by a factor approximately corresponding to $C^k$. Since C is relatively large, a recursion depth of greater than one may only be necessary for very large objects.

In one embodiment, the number of recursive steps may be dynamically determined by considering parameters that include one or more of the following: the expected average chunk size, the size of the objects $O_A$ and/or $O_B$, the data format of the objects $O_A$ and/or $O_B$, the latency and bandwidth characteristics of the network connecting device A and device B.

The fingerprinting function used in step 2 is matched to the fingerprinting function that is used in step 3. Similarly, the fingerprinting function used in step 4.2 is matched to the fingerprinting function that is used in step 4.3. The fingerprinting function from steps 2-3 can optionally be matched to the fingerprinting function from steps 4.2-4.3.

As described previously, each fingerprinting function uses a small data window that surrounds a position in the object; where the value associated with the fingerprinting function depends on all the bytes of the object that are included inside the data window. The size of the data window can be dynamically adjusted based on one or more criteria. Furthermore, the chunking procedure uses the value of the fingerprinting function and one or more additional chunking parameters to determine the chunk boundaries in steps 2-3 and 4.2-4.3 above.

By dynamically changing the window size and the chunking parameters, the chunk boundaries are adjusted such that any necessary data transfers are accomplished with minimal consumption of the available bandwidth.

Example criteria for adjusting the window size and the chunking parameters include: a data type associated with the object, environmental constraints, a usage model, the latency and bandwidth characteristics of the network connecting device A and device B, and any other appropriate model for determining average data transfer block sizes. Example data types include word processing files, database images, spreadsheets, presentation slide shows, and graphic images. An example usage model may be where the average number of bytes required in a typical data transfer is monitored.

Changes to a single element within an application program can result in a number of changes to the associated datum and/or file. Since most application programs have an associated file type, the file type is one possible criteria that is worthy of consideration in adjusting the window size and the chunking parameters. In one example, the modification of a single character in a word processing document results in approximately 100 bytes being changed in the associated file. In another example, the modification of a single element in a database application results in 1000 bytes being changed in the database index file. For each example, the appropriate window size and chunking parameters may be different such that the chunking procedure has an appropriate granularity that is optimized based on the particular application.

Example Process Flow

Figure 4B:
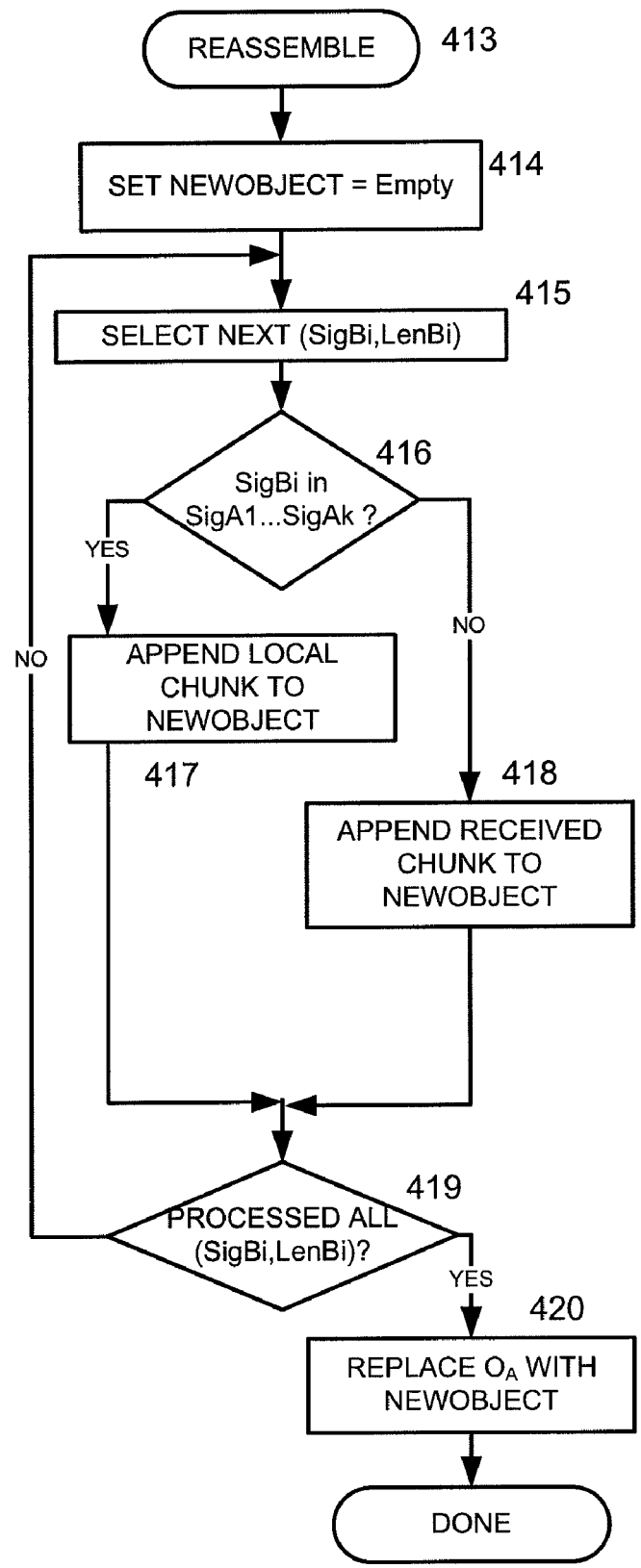

FIGS. 4A and 4B are diagrams illustrating process flows for the interaction between a local device (e.g., device A) and a remote device (e.g., device B) during an example RDC procedure that is arranged in accordance with at least one aspect of the present invention. The left hand side of FIG. 4A illustrates steps 400-413 that are operated on the local device A, while the right hand side of FIG. 4A illustrates steps 450-456 that are operated on the remote device B.

As illustrated in FIG. 4A, the interaction starts by device A requesting an RDC transfer of object $O_B$ in step 400, and device B receiving this request in step 450. Following this, both the local device A and remote device B independently compute fingerprints in steps 401 and 451, divide their respective objects into chunks in steps 402 and 452, and compute signatures (e.g., SHA) for each chunk in steps 403 and 453, respectively.

In step 454, device B sends the signature and chunk length list computed in steps 452 and 453 to device A, which receives this information in step 404.

In step 405, the local device A initializes the list of requested chunks to the empty list, and initializes the tracking offset for the remote chunks to 0. In step 406, the next (signature, chunk length) pair ($Sig_{Bi}$, $Len_{Bi}$) is selected for consideration from the list received in step 404. In step 407, device A checks whether the signature $Sig_{Bi}$ selected in step 406 matches any of the signatures it computed during step 403. If it matches, execution continues at step 409. If it doesn't match, the tracking remote chunk offset and the length in bytes $Len_{Bi}$ are added to the request list in step 408. At step 409, the tracking offset is incremented by the length of the current chunk $Len_{Bi}$.

In step 410, the local device A tests whether all (signature, chunk length) pairs received in step 404 have been processed. If not, execution continues at step 406. Otherwise, the chunk request list is suitably encoded in a compact fashion, compressed, and sent to the remote device B at step 411.

The remote device B receives the compressed list of chunks at step 455, decompresses it, then compresses and sends back the chunk data at step 456.

The local device receives and decompresses the requested chunk data at step 412. Using the local copy of the object $O_A$ and the received chunk data, the local devices reassembles a local copy of $O_B$ at step 413.

FIG. 4B illustrates a detailed example for step 413 from FIG. 4A. Processing continues at step 414, where the local device A initializes the reconstructed object to empty.

In step 415, the next (signature, chunk length) pair ($Sig_{Bi}$, $Len_{Bi}$) is selected for consideration from the list received in step 404. In step 416, device A checks whether the signature $Sig_{Bi}$ selected in step 417 matches any of the signatures it computed during step 403.

If it matches, execution continues at step 417, where the corresponding local chunk is appended to the reconstructed object. If it doesn't match, the received and decompressed remote chunk is appended to the reconstructed object in step 418.

In step 419, the local device A tests whether all (signature, chunk length) pairs received in step 404 have been processed. If not, execution continues at step 415. Otherwise, the reconstructed object is used to replace the old copy of the object $O_A$ on device A in step 420.

Example Recursive Signature Transfer Process Flow

Figure 5A:
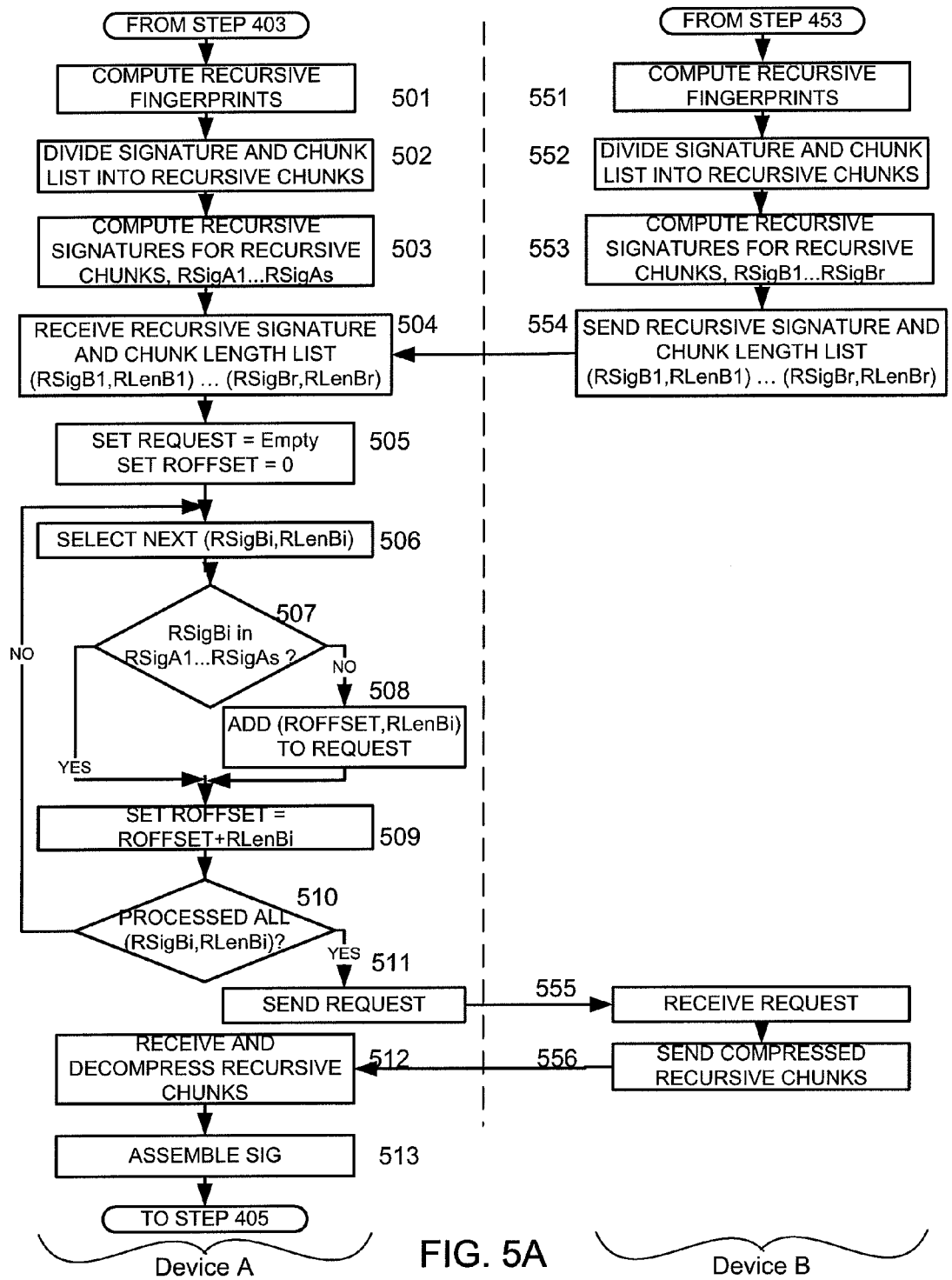
FIGS. 5A and 5B are diagrams illustrating process flows for recursive remote differential compression of the signature and chunk length lists in an example interaction during an RDC procedure.
Figure 5B:
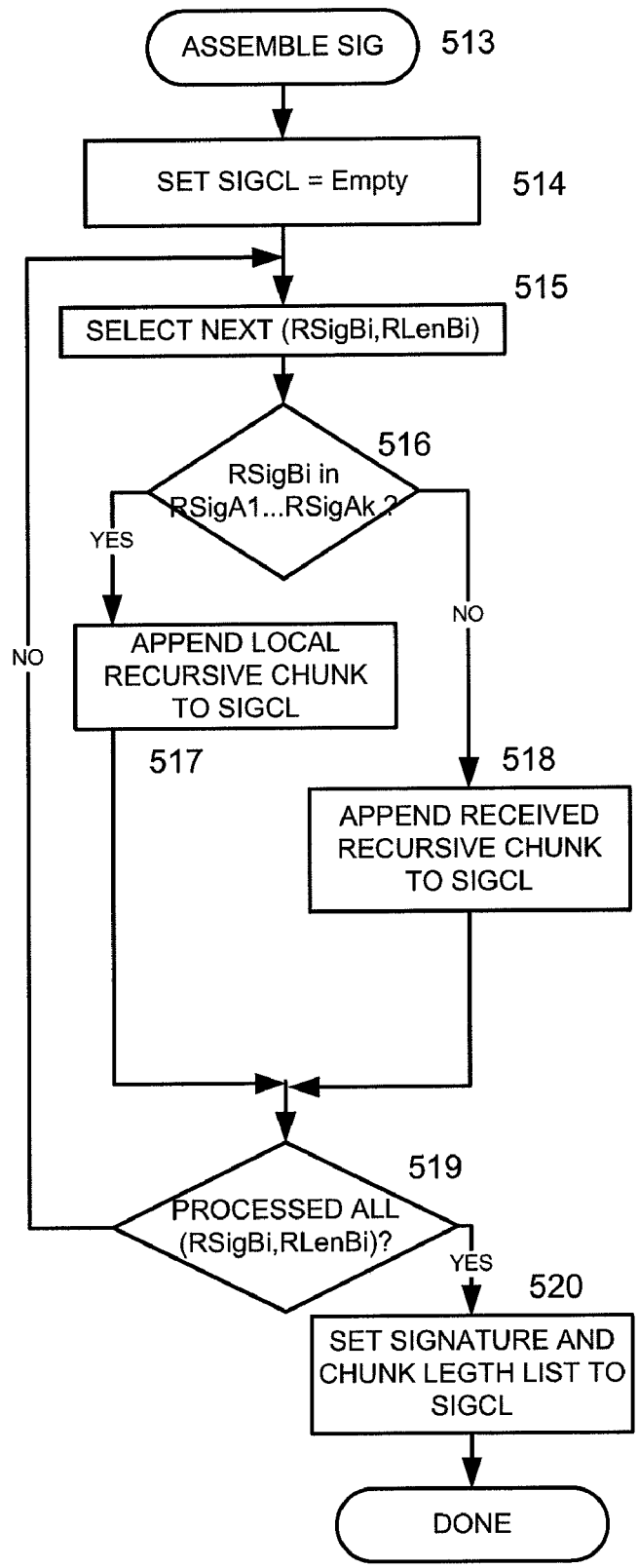

FIGS. 5A and 5B are diagrams illustrating process flows for recursive transfer of the signature and chunk length list in an example RDC procedure that is arranged according to at least one aspect of the present invention. The below described procedure may be applied to both the local and remote devices that are attempting to update commonly associated objects.

The left hand side of FIG. 5A illustrates steps 501-513 that are operated on the local device A, while the right hand side of FIG. 5A illustrates steps 551-556 that are operated on the remote device B. Steps 501-513 replace step 404 in FIG. 4A while steps 551-556 replace step 454 in FIG. 4A.

In steps 501 and 551, both the local device A and remote device B independently compute recursive fingerprints of their signature and chunk length lists $((Sig_{A1}, Len_{A1}), \ldots (Sig_{Ak}, Len_{Ak}))$ and $((Sig_{B1}, Len_{B1}), (Sig_{Bn}, Len_{Bn}))$, respectively, that had been computed in steps 402/403 and 452/453, respectively. In steps 502 and 552 the devices divide their respective signature and chunk length lists into recursive chunks, and in steps 503 and 553 compute recursive signatures (e.g., SHA) for each recursive chunk, respectively.

In step 554, device B sends the recursive signature and chunk length list computed in steps 552 and 553 to device A, which receives this information in step 504.

In step 505, the local device A initializes the list of requested recursive chunks to the empty list, and initializes the tracking remote recursive offset for the remote recursive chunks to 0. In step 506, the next (recursive signature, recursive chunk length) pair $(RSig_{Bi}, RLen_{Bi})$ is selected for consideration from the list received in step 504. In step 507, device A checks whether the recursive signature $RSig_{Bi}$ selected in step 506 matches any of the recursive signatures it computed during step 503. If it matches, execution continues at step 509. If it doesn't match, the tracking remote recursive chunk offset and the length in bytes $RLen_{Bi}$ are added to the request list in step 508. At step 509, the tracking remote recursive offset is incremented by the length of the current recursive chunk $RLen_{Bi}$.

In step 510, the local device A tests whether all (recursive signature, recursive chunk length) pairs received in step 504 have been processed. If not, execution continues at step 506. Otherwise, the recursive chunk request list is compactly encoded, compressed, and sent to the remote device B at step 511.

The remote device B receives the compressed list of recursive chunks at step 555, uncompressed the list, then compresses and sends back the recursive chunk data at step 556.

The local device receives and decompresses the requested recursive chunk data at step 512. Using the local copy of the signature and chunk length list $((Sig_{A1}, Len_{A1}), (Sig_{Ak}, Len_{Ak}))$ and the received recursive chunk data, the local devices reassembles a local copy of the signature and chunk length list $((Sig_{B1}, Len_{B1}), \ldots (Sig_{Bk}, Len_{Bn}))$ at step 513. Execution then continues at step 405 in FIG. 4A.

FIG. 5B illustrates a detailed example for step 513 from FIG. 5A. Processing continues at step 514, where the local device A initializes the list of remote signatures and chunk lengths, SIGCL, to the empty list.

In step 515, the next (recursive signature, recursive chunk length) pair $(RSig_{Bi}, RLen_{Bi})$ is selected for consideration from the list received in step 504. In step 516, device A checks whether the recursive signature $RSig_{Bi}$ selected in step 515 matches any of the recursive signatures it computed during step 503.

If it matches, execution continues at step 517, where device A appends the corresponding local recursive chunk to SIGCL. If it doesn't match, the remote received recursive chunk is appended to SIGCL at step 518.

In step 519, the local device A tests whether all (recursive signature, recursive chunk length) pairs received in step 504 have been processed. If not, execution continues at step 515. Otherwise, the local copy of the signature and chunk length list $((Sig_{B1}, Len_{B1}), \ldots (Sig_{Bk}, Len_{Bn}))$ is set to the value of SIGCL in step 520. Execution then continues back to step 405 in FIG. 4A.

The recursive signature and chunk length list may optionally be evaluated to determine if additional recursive remote differential compression is necessary to minimize bandwidth utilization as previously described. The recursive signature and chunk length list can be recursively compressed using the described chunking procedure by replacing steps 504 and 554 with another instance of the RDC procedure, and so on, until the desired compression level is achieved. After the recursive signature list is sufficiently compressed, the recursive signature list is returned for transmission between the remote and local devices as previously described.

FIG. 6 is a diagram that graphically illustrates an example of recursive compression in an example RDC sequence that is arranged in accordance with an example embodiment. For the example illustrated in FIG. 6, the original object is 9.1 GB of data. A signature and chunk length list is compiled using a chunking procedure, where the signature and chunk length list results in 3 million chunks (or a size of 42 MB). After a first recursive step, the signature list is divided into 33 thousand chunks and reduced to a recursive signature and recursive chunk length list with size 33 KB. By recursively compressing the signature list, bandwidth utilization for transferring the signature list is thus dramatically reduced, from 42 MB to about 395 KB.

Example Object Updating

Figure 7:
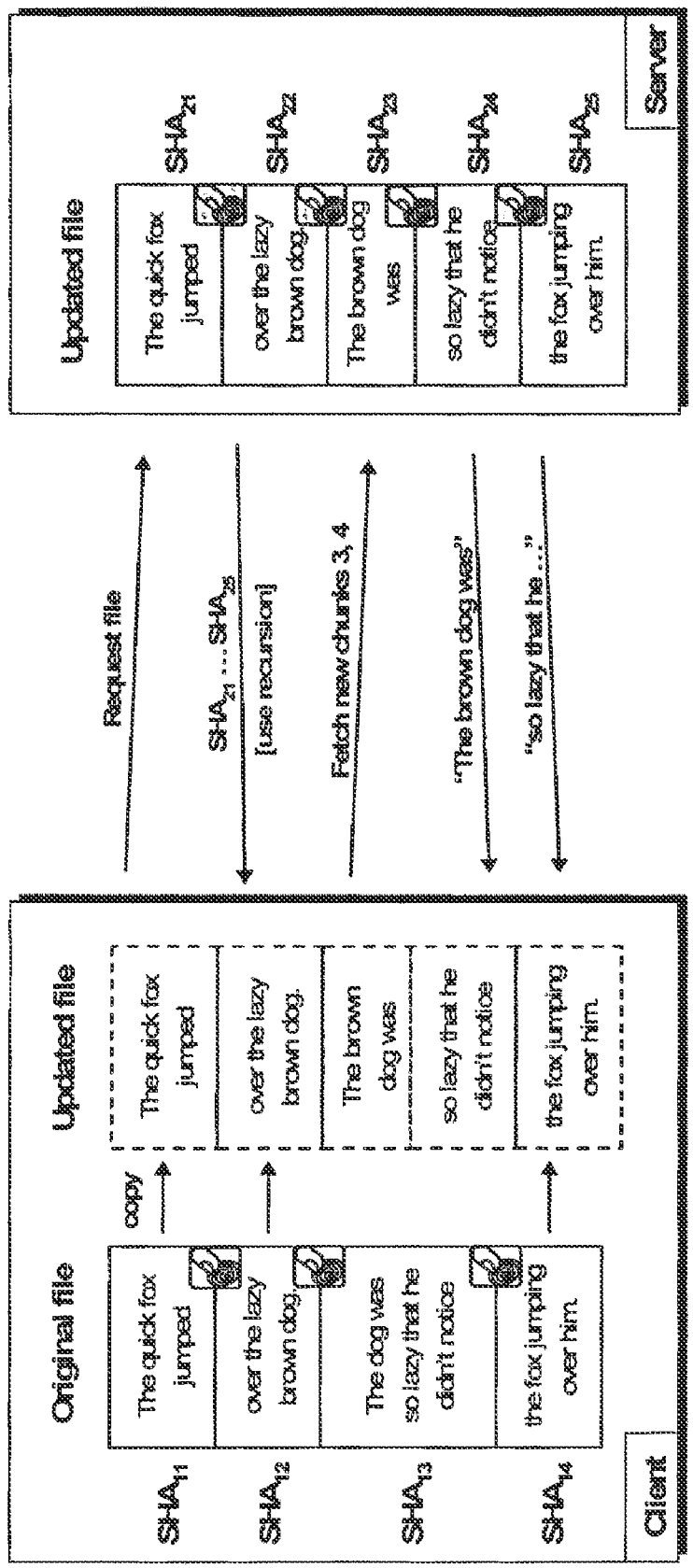
FIG. 7 is a diagram illustrating the interaction of a client and server application using an example RDC procedure.

FIG. 7 is a diagram illustrating the interaction of a client and server application using an example RDC procedure that is arranged according to at least one aspect of the present invention. The original file on both the server and the client contained text "The quick fox jumped over the lazy brown dog. The dog was so lazy that he didn't notice the fox jumping over him."

At a subsequent time, the file on the server is updated to: "The quick fox jumped over the lazy brown dog. The brown dog was so lazy that he didn't notice the fox jumping over him."

As described previously, the client periodically requests the file to be updated. The client and server both chunk the object (the text) into chunks as illustrated. On the client, the chunks are: "The quick fox jumped", "over the lazy brown dog.", "The dog was so lazy that he didn't notice", and "the fox jumping over him."; the client signature list is generated as: $SHA_{11}$, $SHA_{12}$, $SHA_{11}$, and $SHA_{14}$. On the server, the chunks are: "The quick fox jumped", "over the lazy brown dog.", "The brown dog was", "so lazy that he didn't notice", and "the fox jumping over him."; the server signature list is generated as: $SHA_{21}$, $SHA_{22}$, $SHA_{23}$, $SHA_{24}$, and $SHA_{25}$.

The server transmits the signature list ($SHA_{21}$-$SHA_{25}$) using a recursive signature compression technique as previously described. The client recognizes that the locally stored signature list ($SHA_{11}$-$SHA_{14}$) does not match the received signature list ($SHA_{21}$-$SHA_{25}$), and requests the missing chunks 3 and 4 from the server. The server compresses and transmits chunks 3 and 4 ("The brown dog was", and "so lazy that he didn't notice"). The client receives the compressed chunks, decompresses them, and updates the file as illustrated in FIG. 7.

Chunking Analysis

The effectiveness of the basic RDC procedure described above may be increased by optimizing the chunking procedures that are used to chunk the object data and/or chunk the signature and chunk length lists.

The basic RDC procedure has a network communication overhead cost that is identified by the sum of:

(S1) |Signatures and chunk lengths from B|=$|O_B|$*|SigLen|/C, where $|O_B|$ is the size in bytes of Object $O_B$, SigLen is the size in bytes of a (signature, chunk length) pair, and C is the expected average chunk size in bytes; and (S2) Σchunk_length, where (signature, chunk_length)$\notin$ Signatures from B, and signature $\in$ Signatures from A The communication cost thus benefits from a large average chunk size and a large intersection between the remote and local chunks. The choice of how objects are cut into chunks determines the quality of the protocol. The local and remote device must agree, without prior communication, on where to cut an object. The following describes and analyzes various methods for finding cuts.

The following characteristics are assumed to be known for the cutting algorithm:

1. Slack: The number of bytes required for chunks to reconcile between file differences. Consider sequences s1, s2, and s3, and form the two sequences s1s3, s2s3 by concatenation. Generate the chunks for those two sequences Chunks1, and Chunks2. If Chunks1' and Chunks2' are the sums of the chunk lengths from Chunks1 and Chunks2, respectively, until the first common suffix is reached, the slack in bytes is given by the following formula:

$$slack=Chunks_1'-|s_1|=Chunks_2'-|s_2|$$

2. Average Chunk Size C:

When Objects $O_A$ and $O_B$ have S segments in common with average size K, the number of chunks that can be obtained locally on the client is given by:

$$S*\lfloor(K-slack)/C\rfloor$$

and (S2) above rewrites to:

$$|O_A|-S*\lfloor(K-slack)/C\rfloor$$

Thus, a chunking algorithm that minimizes slack will minimize the number of bytes sent over the wire. It is therefore advantageous to use chunking algorithms that minimize the expected slack.

Fingerprinting Functions

All chunking algorithms use a fingerprinting function, or hash, that depends on a small window, that is, a limited sequence of bytes. The execution time of the hash algorithms used for chunking is independent of the hash window size when those algorithms are amenable to finite differencing (strength reduction) optimizations. Thus, for a hash window of size k it is should be easy (require only a constant number of steps) to compute the hash #[$b_1, \ldots, b_{k-1}, b_k$] using $b_0$, $b_k$, and #[$b_0, b_1, \ldots, b_{k-1}$] only. Various hashing functions can be employed such as hash functions using Rabin polynomials, as well as other hash functions that appear computationally more efficient based on tables of pre-computed random numbers.

In one example, a 32 bit Adler hash based on the rolling checksum can be used as the hashing function for fingerprinting. This procedure provides a reasonably good random hash function by using a fixed table with 256 entries, each a pre-computed 16 bit random number. The table is used to convert fingerprinted bytes into a random 16 bit number. The 32 bit hash is split into two 16 bit numbers sum1 and sum2, which are updated given the procedure:

$$sum1+=table[b_k]-table[b_0]$$

$$sum2+=sum1-k*table[b_0]$$

In another example, a 64 bit random hash with cyclic shifting may be used as the hashing function for fingerprinting. The period of a cyclic shift is bounded by the size of the hash value. Thus, using a 64 bit hash value sets the period of the hash to 64. The procedure for updating the hash is given as:

$$hash=hash\string^((table[b_0]<<1)|(table[b_0]>>u))\string^table[b_k];$$

$$hash=(hash<<1)|(hash>>63);$$

where $l=k\%\ 64$ and $u=64-l$

In still another example, other shifting methods may be employed to provide fingerprinting. Straight forward cyclic shifting produces a period of limited length, and is bounded by the size of the hash value. Other permutations have longer periods. For instance, the permutation given by the cycles (1 2 3 0) (5 6 7 8 9 10 11 12 13 14 4) (16 17 18 19 20 21 15) (23 24 25 26 22) (28 29 27) (31 30) has a period of length 4*3*5*7*11=4620. The single application of this example permutation can be computed using a right shift followed by operations that patch up the positions at the beginning of each interval.

Analysis of Previous Art for Chunking at Pre-Determined Patterns

Previous chunking methods are determined by computing a fingerprinting hash with a pre-determined window size k (=48), and identifying cut points based on whether a subset of the hash bits match a pre-determined pattern. With random hash values, this pattern may as well be 0, and the relevant subset may as well be a prefix of the hash. In basic instructions, this translates to a predicate of the form:

$$CutPoint(hash)=0==(hash\ \&\ ((1<<c)-1)),$$

where c is the number of bits that are to be matched against.

Since the probability for a match given a random hash function is $2^{-c}$, an average chunk size $C=2^c$ results. However, neither the minimal, nor the maximal chunk size is determined by this procedure. If a minimal chunk length of m is imposed, then the average chunk size is:

$$C=m+2^c$$

A rough estimate of the expected slack is obtained by considering streams $s_1s_3$ and $s_2s_3$. Cut points in $s_1$ and $s_2$ may appear at arbitrary places. Since the average chunk length is $C=m+2^c$, about $(2^c/C)^2$ of the last cut-points in $s_1$ and $s_2$ will be beyond distance m. They will contribute to slack at around $2^c$. The remaining $1-(2^c/C)^2$ contribute with slack of length about C. The expected slack will then be around $(2^c/C)^3+(1-(2^c/C)^2)*(C/C)=(2^c/C)^3+1-(2^c/C)^2$, which has global minimum for $m=2^{c-1}$, with a value of about $23/27=0.85$. A more precise analysis gives a somewhat lower estimate for the remaining $1-(2^c/C)^2$ fraction, but will also need to compensate for cuts within distance m inside $s_3$, which contributes to a higher estimate.

Thus, the expected slack for the prior art is approximately $0.85*C$.

Chunking at Filters (New Art)

Chunking at filters is based on fixing a filter, which is a sequence of patterns of length m, and matching the sequence of fingerprinting hashes against the filter. When the filter does not allow a sequence of hashes to match both a prefix and a suffix of the filter it can be inferred that the minimal distance between any two matches must be at least m. An example filter may be obtained from the CutPoint predicate used in the previous art, by setting the first $m-1$ patterns to $$0!=(hash\ \&\ ((1<<c)-1))$$

and the last pattern to:

$$0==(hash\ \&\ ((1<<c)-1)).$$

The probability for matching this filter is given by $(1-p)^{m-1}p$ where p is $2^{-c}$. One may compute that the expected chunk length is given by the inverse of the probability for matching a filter (it is required that the filter not allow a sequence to match both a prefix and suffix), thus the expected length of the example filter is $(1-p)^{-m+1}p^{-1}$. This length is minimized when setting $p:=1/m$, and it turns out to be around $(e*m)$. The average slack hovers around 0.8, as can be verified by those skilled in the art. An alternative embodiment of this method uses a pattern that works directly with the raw input and does not use rolling hashes.

Chunking at Local Maxima (New Art)

Chunking at Local Maxima is based on choosing as cut points positions that are maximal within a bounded horizon. In the following, we shall use h for the value of the horizon. We say that the hash at position offset is an h-local maximum if the hash values at offsets offset−h, . . . , offset−1, as well as offset+1, offset+h are all smaller than the hash value at offset. In other words, all positions h steps to the left and h steps to the right have lesser hash values. Those skilled in the art will recognize that local maxima may be replaced by local minima or any other metric based comparison (such as "closest to the median hash value").

Figure 8:
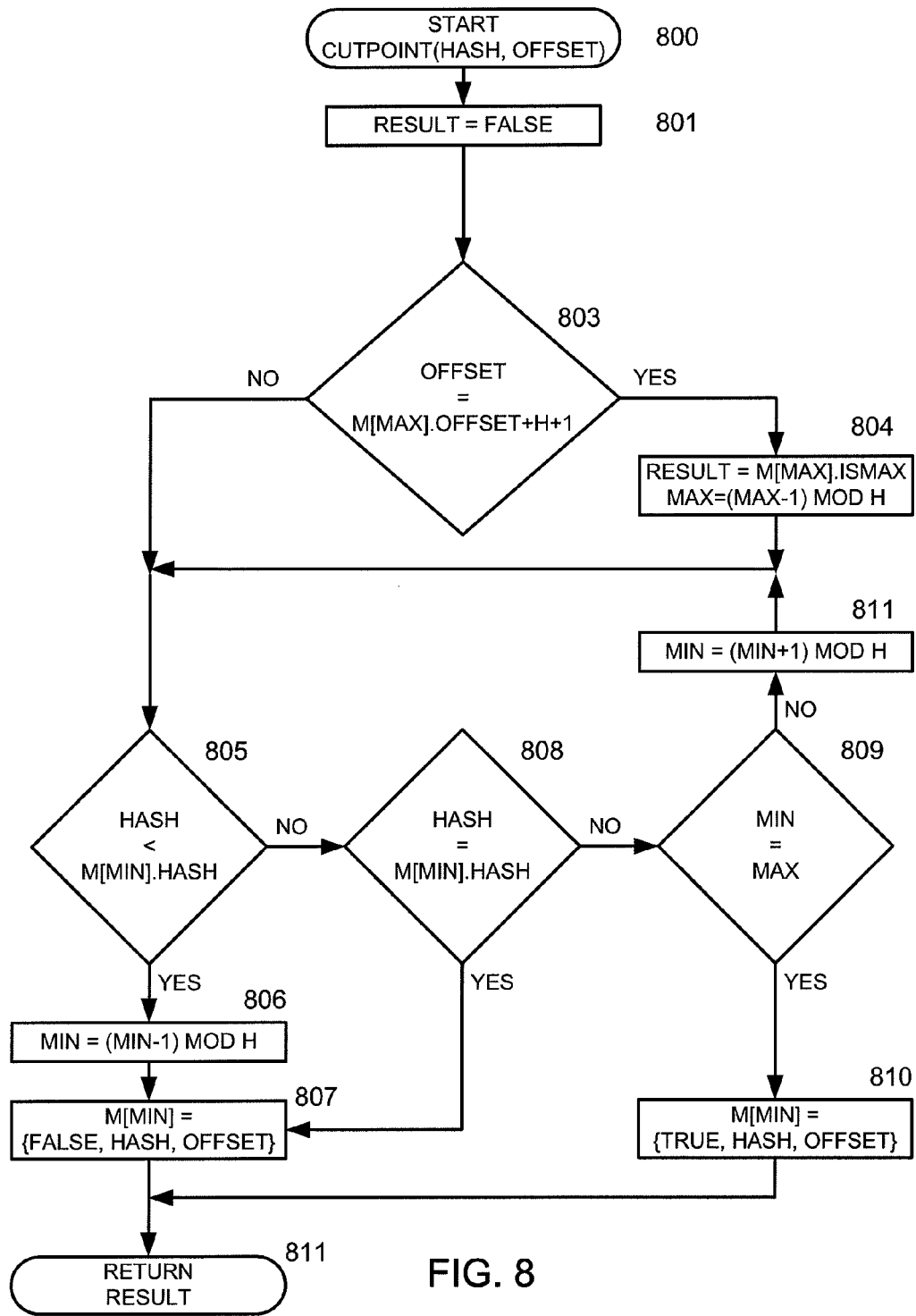
FIG. 8 is a diagram illustrating a process flow for an example chunking procedure.

The set of local maxima for an object of size n may be computed in time bounded by 2·n operations such that the cost of computing the set of local maxima is close to or the same as the cost of computing the cut-points based on independent chunking Chunks generated using local maxima always have a minimal size corresponding to h, with an average size of approximately $2h+1$. A CutPoint procedure is illustrated in FIGS. 8 and 9, and is described as follows below:

1. Allocate an array M of length h whose entries are initialized with the record {is Max=false, hash=0, offset=0}. The first entry in each field (isMax) indicates whether a candidate can be a local maximum. The second field entry (hash) indicates the hash value associated with that entry, and is initialized to 0 (or alternatively, to a maximal possible hash value). The last field (offset) in the entry indicates the absolute offset in bytes to the candidate into the fingerprinted object.
2. Initialize offsets min and max into the array M to 0. These variables point to the first and last elements of the array that are currently being used.
3. CutPoint(hash, offset) starts at step 800 in FIG. 8 and is invoked at each offset of the object to update M and return a result indicating whether a particular offset is a cutpoint.
   The procedure starts by setting result=false at step 801. At step 803, the procedure checks whether M[max].offset+h+1=offset. If this condition is true, execution continues at step 804 where the following assignments are performed: result is set to M[max].is Max, and max is set to max−1% h. Execution then continues at step 805. If the condition at step 803 is false, execution continues at step 805. At step 805, the procedure checks whether M[min].hash>hash. If the condition is true, execution continues at step 806, where min is set to (min−1) % h. Execution the continues at step 807 where M[min] is set to {isMax=false, hash=hash, offset=offset}, and to step 811, where the computed result is returned.
   If the condition at step 805 is false, execution continues to step 808, where the procedure checks for whether M[min].hash=hash. If this condition is true, execution continues at step 807.
   If the condition at step 808 is false, execution continues at step 809, where the procedure checks whether min=max. If this condition is true, execution continues at step 810, where M[min] is set to {isMax=true, hash=hash, offset=offset}. Execution then continues at step 811, where the computed result is returned.
   If the condition at step 809 is false, execution continues at step 811, where min is set to (min+1) % h. Execution then continues back at step 805.
4. When CutPoint(hash, offset) returns true, it will be the case that the offset at position offset−h−1 is a new cutpoint.

Analysis of Local Maximum Procedure

An object with n bytes is processed by calling CutPoint n times such that at most n entries are inserted for a given object. One entry is removed each time the loop starting at step 805 is repeated such that there are no more than n entries to delete. Thus, the processing loop may be entered once for every entry and the combined number of repetitions may be at most n. This implies that the average number of steps within the loop at each call to CutPoint is slightly less than 2, and the number of steps to compute cut points is independent of h.

Since the hash values from the elements form a descending chain between min and max, we will see that the average distance between min and max (|min−max|% h) is given by the natural logarithm of h. Offsets not included between two adjacent entries in M have hash values that are less than or equal to the two entries. The average length of such chains is given by the recurrence equation $f(n)=1+1/n*\Sigma_{k<n} f(k)$. The average length of the longest descending chain on an interval of length n is 1 greater than the average length of the longest descending chain starting from the position of the largest element, where the largest element may be found at arbitrary positions with a probability of $1/n$. The recurrence relation has as solution corresponding to the harmonic number $H_n=1+\frac{1}{2}+\frac{1}{3}+\frac{1}{4}+\ldots+1/n$, which can be validated by substituting $H_n$ into the equation and performing induction on n. $H_n$ is proportional to the natural logarithm of n. Thus, although array M is allocated with size h, only a small fraction of size $\ln(h)$ is ever used at any one time.

Computing min and max with modulus h permits arbitrary growth of the used intervals of M as long as the distance between the numbers remain within h.

The choice of initial values for M implies that cut-points may be generated within the first h offsets. The algorithm can be adapted to avoid cut-points at these first h offsets.

The expected size of the chunks generated by this procedure is around 2h+1. We obtain this number from the probability that a given position is a cut-point. Suppose the hash has m different possible values. Then the probability is determined by:

$$\Sigma_{0 \leq k < m} 1/m (k/m)^{2h}.$$

Approximating using integration $\int_{0 \leq x < m} 1/m(x/m)^{2h} dx = 1/(2h+1)$ indicates the probability when m is sufficiently large.

The probability can be computed more precisely by first simplifying the sum to:

$$(1/m)^{2h+1} \Sigma_{0 \leq k < m} k^{2h},$$

which using Bernoulli numbers $B_k$ expands to:

$$(1/m)^{2h+1} 1/(2h+1) \Sigma_{0 \leq k < 2h} (2h+1)!/k!(2h+1-k)! B_k m^{2h+1-k}$$

The only odd Bernoulli number that is non-zero is $B_1$, which has a corresponding value of $-½$. The even Bernoulli numbers satisfy the equation:

$$H_\infty^{(2n)} = (-1)^{n-1} 2^{2n-1} \pi^{2n} B_{2n}/(2n)!$$

The left hand side represents the infinite sum $1+(½)2n+(⅓)2n+\ldots$, which for even moderate values of n is very close to 1.

When m is much larger than h, all of the terms, except for the first can be ignored, as we saw by integration. They are given by a constant between 0 and 1 multiplied by a term proportional to $h^{k-1}/m^k$. The first term (where $B_0=1$) simplifies to $1/(2h+1)$. (the second term is $-1/(2m)$, the third is $h/(6 m^2)$).

For a rough estimate of the expected slack consider streams $s_1s_3$ and $s_2s_3$. The last cut points inside $s_i$ and $s_2$ may appear at arbitrary places. Since the average chunk length is about 2h+1 about ¼'th of the last cut-points will be within distance h in both $s_1$ and $S_2$. They will contribute to cut-points at around ⅞ h. In another ½ of the cases, one cut-point will be within distance h the other beyond distance h. These contribute with cut-points around ¾h. The remaining ¼'th of the last cut-points in $s_1$ and $s_2$ will be in distance larger than h. The expected slack will therefore be around ¼*⅞+*½*¾+¼*¼=0.66.

Thus, the expected slack for our independent chunking approach is 0.66*C, which is an improvement over the prior art (0.85*C).

There is an alternate way of identifying cut-points that require executing in average fewer instructions while using space at most proportional to h, or in average ln h. The procedure above inserts entries for every position 0 . . . n−1 in a stream of length n. The basic idea in the alternate procedure is to only update when encountering elements of an ascending chain within intervals of length h. We observed that there will in average only be ln h such updates per interval. Furthermore, by comparing the local maxima in two consecutive intervals of length h one can determine whether each of the two local maxima may also be an h local maximum. There is one peculiarity with the alternate procedure; it requires computing the ascending chains by traversing the stream in blocks of size h, each block gets traversed in reverse direction.

In the alternate procedure (see FIGS. 10 and 11), we assume for simplicity that a stream of hashes is given as a sequence. The subroutine CutPoint gets called for each subsequence of length h (expanded to "horizon" in the Figures). It returns zero or one offsets which are determined to be cut-points. Only ln(h) of the calls to Insert will pass the first test.

Insertion into A is achieved by testing the hash value at the offset against the largest entry in A so far.

The loop that updates both A[k] and B[k].isMax can be optimized such that in average only one test is performed in the loop body. The case B[]].hash<=A[k].hash and B[]].isMax is handled in two loops, the first checks the hash value against B[ℏ].hash until it is not less, the second updates A[k]. The other case can be handled using a loop that only updates A[k] followed by an update to B[]].isMax.

Each call to CutPoint requires in average ln h memory writes to A, and with loop hoisting h+ln h comparisons related to finding maxima. The last update to A[k].isMax may be performed by binary search or by traversing B starting from index 0 in at average at most log ln h steps. Each call to CutPoint also requires re-computing the rolling hash at the last position in the window being updated. This takes as many steps as the size of the rolling hash window.

Observed Benefits of the Improved Chunking Algorithms

The minimal chunk size is built into both the local maxima and the filter methods described above. The conventional implementations require that the minimal chunk size is supplied separately with an extra parameter.

The local max (or mathematical) based methods produce measurable better slack estimate, which translates to further compression over the network. The filter method also produces better slack performance than the conventional methods.

Both of the new methods have a locality property of cut points. All cut points inside s3 that are beyond horizon will be cut points for both streams s1s3 and s2s3. (in other words, consider stream s1s3, if p is a position≧|s1|+horizon and p is a cut point in s1s3, then it is also a cut point in s2s3. The same property holds the other direction (symmetrically), if p is a cut point in s2s3, then it is also a cut point in s1s3). This is not the case for the conventional methods, where the requirement that cuts be beyond some minimal chunk size may interfere adversely.

Alternative Mathematical Functions

Although the above-described chunking procedures describe a means for locating cut-points using a local maxima calculation, the present invention is not so limited. Any mathematical function can be arranged to examine potential cut-points. Each potential cut-point is evaluated by evaluating hash values that are located within the horizon window about a considered cut-point. The evaluation of the hash values is accomplished by the mathematical function, which may include at least one of locating a maximum value within the horizon, locating a minimum values within the horizon, evaluating a difference between hash values, evaluating a difference of hash values and comparing the result against an arbitrary constant, as well as some other mathematical or statistical function.

The particular mathematical function described previously for local maxima is a binary predicate "_>_". For the case where p is an offset in the object, p is chosen as a cut-point if $hash_p > hash_k$, for all k, where p-horizon≦k<p, or p<k≦p+horizon. However, the binary predicate>can be replaced with any other mathematical function without deviating from the spirit of the invention.

Finding Candidate Objects for Remote Differential Compression

The effectiveness of the basic RDC procedure described above may be increased by finding candidate objects on the receiver, for signature and chunk reuse during steps 4 and 8 of the RDC algorithm, respectively. The algorithm helps Device A identify a small subset of objects denoted by: $O_{A1}, O_{A2}, \ldots, O_{An}$ that are similar to the object $O_B$ that needs to be transferred from Device B using the RDC algorithm. $O_{A1}$, $O_{A2}, \ldots, O_{An}$ are part of the objects that are already stored on Device A.

The similarity between two objects $O_B$ and $O_A$ is measured in terms of the number of distinct chunks that the two objects share divided by the total number of distinct chunks in the first object. Thus if Chunks($O_B$) and Chunks($O_A$) are the sets of chunks computed for $O_B$ and $O_A$ of the RDC algorithm, respectively, then, using the notation |X| to denote the cardinality, or number of elements, of set X:

$$\text{Similarity}(O_B, O_A) = \frac{\left|\left\{ \begin{array}{c} c_B \mid c_B \in \text{Chunks}(O_B) \wedge \\ \exists\, c_A \in \text{Chunks}(O_A) \cdot c_B = c_A \end{array} \right\}\right|}{\left| \begin{array}{c} \{c_B \mid c_B \in \text{Chunks}(O_B)\} \cup \\ \{c_A \mid c_A \in \text{Chunks}(O_A)\} \end{array} \right|}$$

As a proxy for chunk equality, the equality on the signatures of the chunks is used. This is highly accurate if the signatures are computed using a cryptographically secure hash function (such as SHA-1 or MD5), given that the probability of a hash collision is extremely low. Thus, if Signatures($O_B$) and Signatures($O_A$) are the sets of chunk signatures computed for $O_B$ and $O_A$ in the chunking portion of the RDC algorithm, then:

$$\text{Similarity}(O_B, O_A) \cong \frac{\left|\left\{ \begin{array}{c} \text{Sig}_B \mid \text{Sig}_B \in \text{Signatures}(O_B) \wedge \\ \exists\, \text{Sig}_A \in \text{Signatures}(O_A) \cdot \text{Sig}_B = \text{Sig}_A \end{array} \right\}\right|}{\left| \begin{array}{c} \{\text{Sig}_B \mid \text{Sig}_B \in \text{Signatures}(O_B)\} \cup \\ \{\text{Sig}_A \mid \text{Sig}_A \in \text{Signatures}(O_A)\} \end{array} \right|}$$

Given an object $O_B$ and the set of objects Objects$_A$ that are stored on Device A, the members of Objects$_A$ that have a degree of similarity with $O_B$ which exceeds a given threshold s are identified. A typical value for s may be s=0.5, (50% similarity) i.e. we are interested in objects that have at least half of their chunks in common with $O_B$. The value for s, however, may be set at any value that makes sense for the application. For example, s could be set between 0.01 and 1.0 (1% similar to 100% similar). This set of objects is defined as:

Similar($O_B$,Objects$_A$,s)={$O_A | O_A \in$Objects$_A$ˆSimilarity ($O_B,O_A$)≧s}

The set of objects $O_{A1}, O_{A2}, O_{An}$ is computed as a subset of Similar($O_B$, Objects$_A$, s) by taking the best n matches.

The basic RDC algorithm described above is modified as follows to identify and use the set of similar objects $O_{A1}, O_{A2}, O_{An}$.

Figure 12:
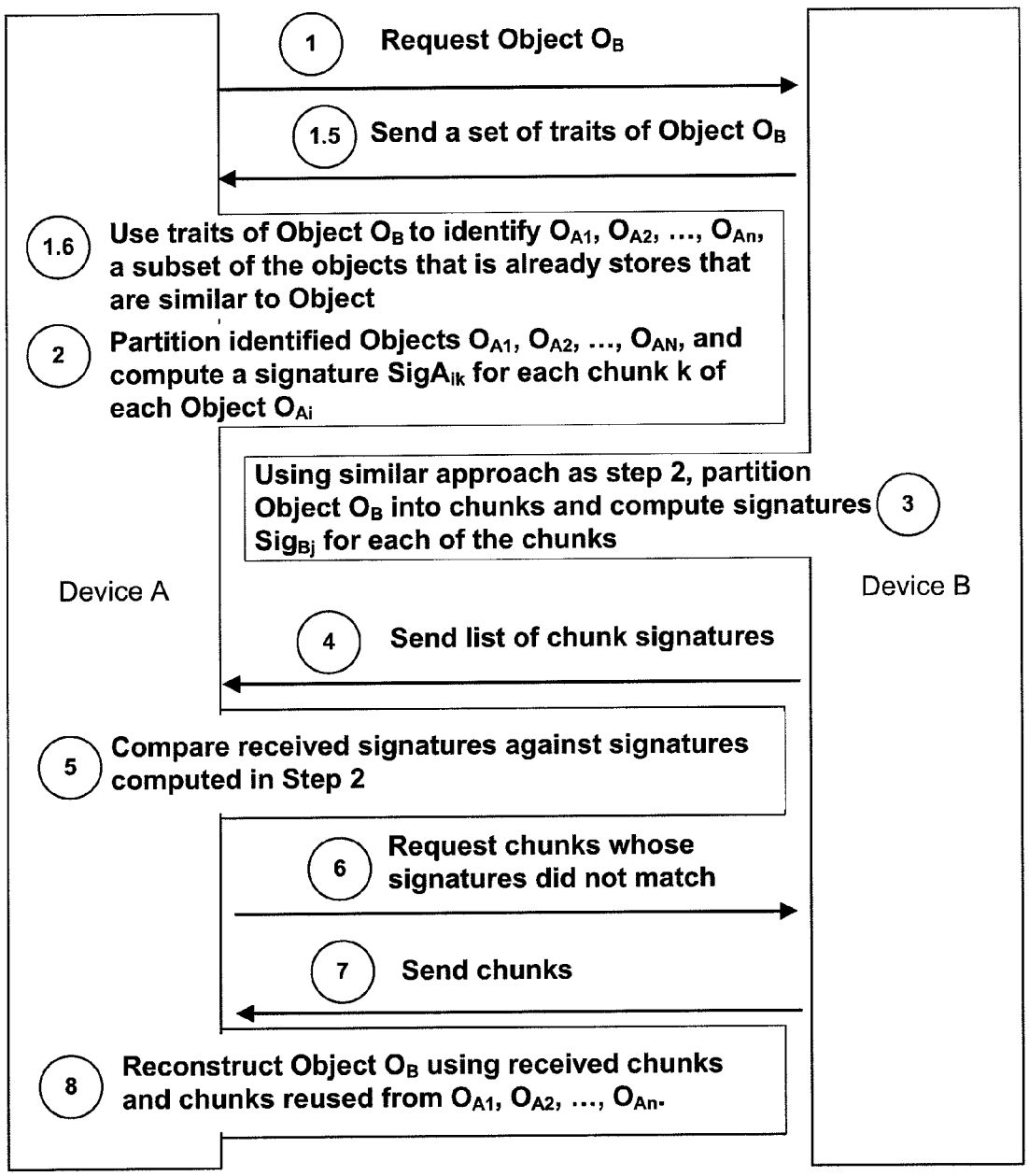
FIG. 12 illustrates an RDC algorithm modified to find and use candidate objects.

FIG. 12 illustrates an RDC algorithm modified to find and use candidate objects, in accordance with aspects of the invention. The protocol for finding and using candidate objects on Device A and the transferring the updated object $O_B$ from device B to device A is described. A similar protocol may be used to transfer an object from device A to device B, and the transfer can be initiated at the behest of either device A or device B without significantly changing the protocol described below.

1. Device A sends device B a request to transfer Object $O_B$ using the RDC protocol.
1.5 Device B sends Device A a set of traits of Object $O_B$, Traits($O_B$). Generally, the traits are a compact representation of the characteristics relating to object $O_B$. As will be described later, Device B may cache the traits for $O_B$ so that it does not need to recompute them prior to sending them to Device A.
1.6. Device A uses Traits($O_B$) to identify $O_{A1}, O_{A2}, \ldots, O_{An}$, a subset of the objects that it already stores, that are similar to Object $O_B$. This determination is made in a probabilistic manner.
2. Device A partitions the identified Objects $O_{A1}, O_{A2}, \ldots, O_{An}$ into chunks. The partitioning occurs in a data-dependent fashion, by using a fingerprinting function that is computed at every byte position of the objects. A chunk boundary is determined at positions for which the fingerprinting function satisfies a given condition. Following the partitioning into chunks, Device A computes a signature Sig$_{Aik}$ for each chunk k of each Object $O_{Ai}$.
3. Using a similar approach as in step 2, Device B partitions Object $O_B$ into chunks, and computes the signatures Sig$_{Bj}$ for each of the chunks. The partitioning algorithm used in step 3 must match the one in step 2 above.
4. Device B sends list of chunk signatures (Sig$_{B1}$ ... Sig$_{Bn}$) to Device A. This list provides the basis for Device A being able to reconstruct Object $O_B$. In addition to the chunk signatures Sig$_{Bi}$, information will be sent about the offset and length of each chunk in Object $O_B$.
5. As Device A receives the chunk signatures from Device B, it compares the received signatures against the set of signatures (Sig$_{A11}$, Sig$_{A1m}$, ..., Sig$_{An1}$, ... Sig$_{An1}$) that it has computed in step 2. As part of this comparison, Device A records every distinct signature value it received from Device B that does not match one of its own signatures Sig$_{Aik}$ computed on the chunks of Objects $O_{A1}, O_{A2}, \ldots, O_{An}$.
6. Device A sends a request to Device B for all the chunks whose signatures were received in the previous step from Device B, but which did not have a matching signature on Device A. The chunks are requested by offset and length in Object $O_B$, based on corresponding information that was sent in Step 4.
7. Device B sends the content associated with all the requested chunks to device A.
8. Device A reconstructs Object $O_B$ by using the chunks received in step 6 from Device B, as well as its own chunks of objects $O_{A1}, O_{A2}, \ldots, O_{An}$ that matched signatures sent by Device B in step 4. After this reconstruction step is complete, Device A may now add the reconstructed copy of Object $O_B$ to its already stored objects.

To minimize network traffic and CPU overhead, Traits($O_B$) should be very small and the determination of the set of similar objects $O_{A1}, O_{A2}, \ldots, O_{An}$ be performed with very few operations on Device A.

Computing the Set of Traits for an Object

The set of traits for a object O, Traits(O), is computed based on the chunk signatures computed for O, as described for steps 2 or 3 of the RDC algorithm, respectively.

Figure 13:
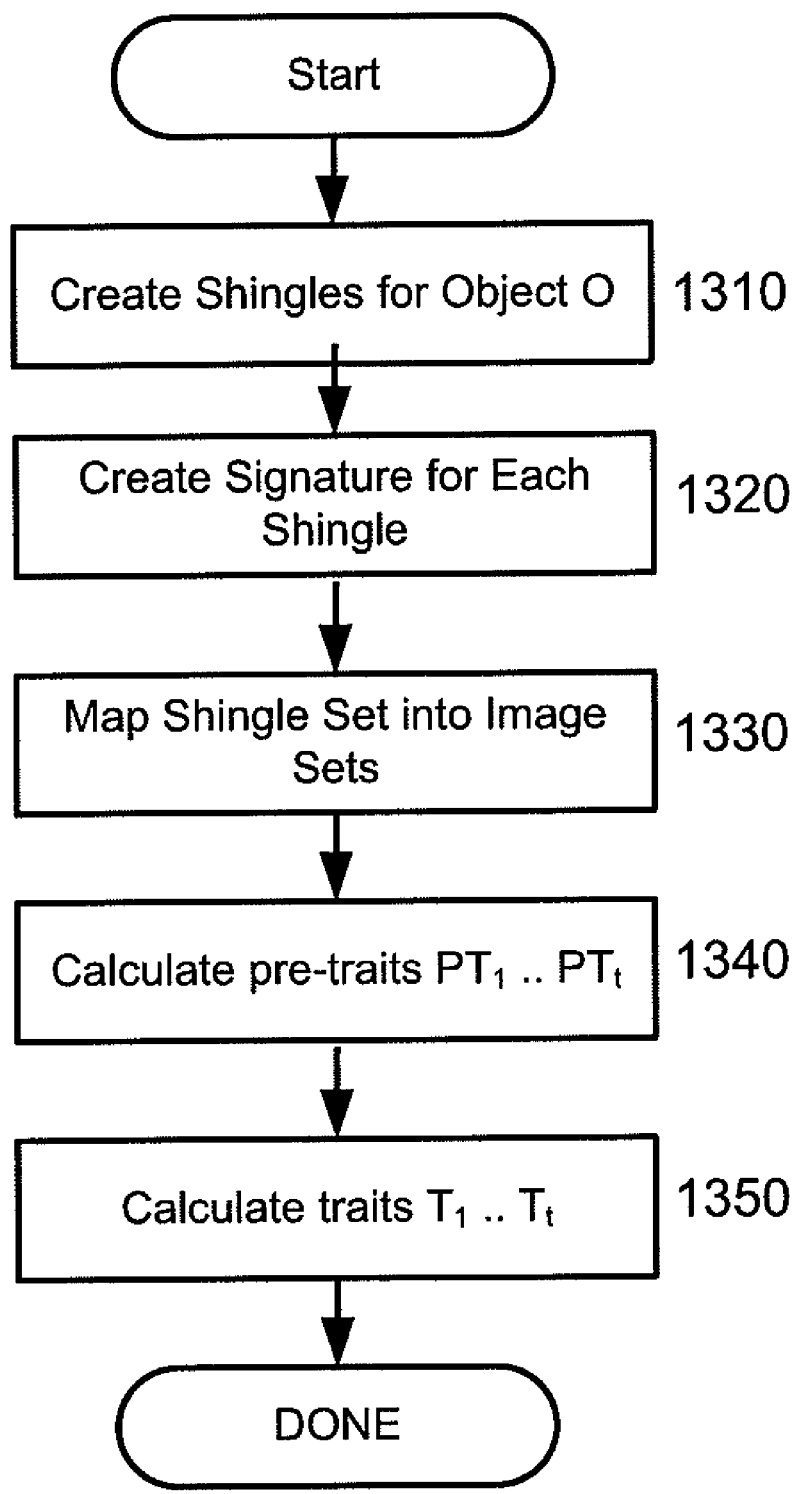
FIGS. 13 and 14 show a process and an example of a trait computation.
Figure 14:
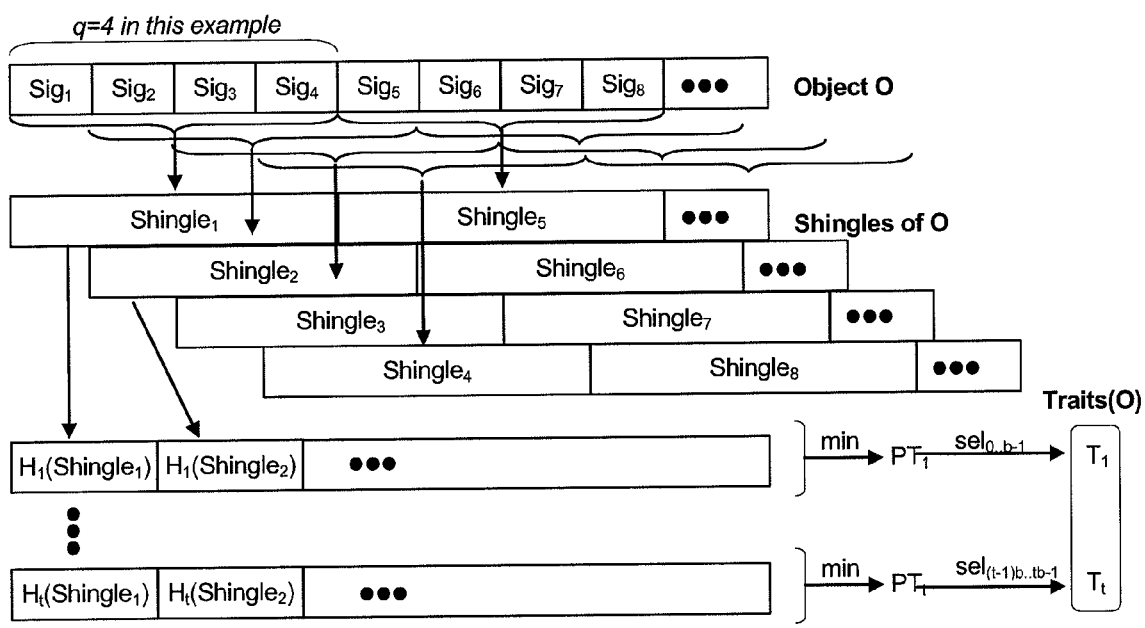

FIGS. 13 and 14 show a process and an example of a trait computation, in accordance with aspects of the invention.

The algorithm for identifying similar objects has four main parameters (q, b, t, x) that are summarized below.

| | |
|---|---|
| q | Shingle size |
| b | Number of bits per trait |
| t | Number of traits per object |
| x | Minimum number of matching traits |

The following steps are used to compute the traits for object O, Traits(O).

1. At block 1310, the chunk signatures of O, $Sig_1 \ldots Sig_n$ are grouped together into overlapping shingles of size q, where every shingle comprises q chunk signatures, with the exception of the last q−1 shingles, which will contain fewer than q signatures. Other groupings (discontiguous subsets, disjoint subsets, etc.) are possible, but it is practically useful that inserting an extra signature causes all of the previously considered subsets to still be considered.

2. At block 1320, for each shingle 1 ... n, a shingle signature $Shingle_1 \ldots Shingle_n$ is computed by concatenating the q chunk signatures forming the shingle. For the case where q=1, $Shingle_1=Sig_1, \ldots, Shingle_n=Sig_n$.

3. At block 1330, the shingle set $\{Shingle_1 \ldots Shingle_n\}$ is mapped into t image sets through the application of t hash functions $H_1 \ldots H_t$. This generates t image sets, each containing n elements:

$IS_1 = \{H_1(Shingle_1), H_1(Shingle_2), \ldots, H_1(Shingle_n)\}$

...

$IS_t = \{H_t(Shingle_1), H_t(Shingle_2), \ldots, H_t(Shingle_n)\}$

4. At block 1340, the pre-traits $PT_1 \ldots PT_t$ are computed by taking the minimum element of each image set:

$PT_1 = \min(IS_1)$

...

$PT_t = \min(IS_t)$.

Other deterministic mathematical functions may also be used to compute the pre-traits. For example, the pre-traits $PT_1 \ldots PT_t$ are computed by taking the maximum element of each image set:

$PT_1 = \max(IS_1)$

...

$PT_t = \max(IS_t)$.

Mathematically, any mapping carrying values into a well-ordered set will suffice, max and min on bounded integers being two simple realizations.

5. At block 1350, the traits $T_1 \ldots T_t$ are computed by selecting b bits out of each pre-trait $PT_1 \ldots PT_t$. To preserve independence of the samples, it is better to choose non-overlapping slices of bits, 0 ... b−1 for the first, b ... 2b−1 for the second, etc, if the pre-traits are sufficiently long:

$T_1 = \text{select}_{0 \ldots b-1}(PT_1)$.

...

$T_t = \text{select}_{(t-1)b \ldots tb-1}(PT_t)$

Any deterministic function may be used to create traits that are smaller in size than the pre-traits. For instance, a hash function could be applied to each of the pre-traits so long as the size of the result is smaller than the pre-trait; if the total number of bits needed (tb) exceeds the size of a pre-trait, some hash functions should be used to expand the number of bits before selecting subsets.

The number of traits t and the trait size b are chosen so that only a small total number of bits (t*b) is needed to represent the traits for an object. This is advantageous if the traits are precomputed and cached by Device A, as will be described below. According to one embodiment, some typical combinations of (b,t) parameters that have been found to work well are e.g. (4,24) and (6,16), for a total of 96 bits per object. Any other combinations may also be used. For purposes of explanation, the $i^{th}$ trait of object A will be denoted by $T_i(A)$.

Efficiently Selecting the Pre-traits

To efficiently select the pre-traits $PT_1 \ldots PT_t$, the following approach is used, allowing partial evaluation of the shingles, and thus reducing the computational requirements for selecting the pre-traits. Logically, each $H_i$ is divided into two parts, $High_i$ and $Low_i$. Since only the minimum element of each image set is selected, the $High_i$ is computed for every chunk signature and the $Low_i$ is computed only for those chunk signatures which achieve the minimum value ever achieved for $High_i$. If the High values are drawn from a smaller space, this may save computation. If, further, several High values are bundled together, significant computation may be saved. Suppose, for instance, that each High value is 8 bits long. Eight of these can be packed into a long integer; at the cost of computing a single 8-byte hash from a signature, that value can be chopped into eight independent one byte-slices. If only the High value were needed, this would reduce computational costs by a factor of eight. However, on average one time in 256 a corresponding Low value needs to be computed and compared to other Low values corresponding to equal High values.

Finding Similar Objects Using the Sets of Traits

The algorithm approximates the set of objects similar to a given object $O_B$ by computing the set of objects having similar traits to $O_B$:

$\text{Traitsimilarity}(O_B, O_A) = |\{i | T_i(A) = T_i(B)\}|$ $\text{SimilarTraits}(O_B, \text{Objects}_A, x) = \{O_A | O_A \in \text{Objects}_A \, 0 \, \text{TraitSimilarity}(O_B, O_A) \geq t\}$ Other computations from which these values might be derived would work just as well.

To select the n most similar objects to a given object $O_B$, SimilarTraits($O_B$, Objects$_A$, x) is computed and the n best matching objects out of that set are taken. If the size of SimilarTraits($O_B$, Objects$_A$, x) is smaller than n, the entire set is taken. The resulting set of objects forms a potential set of objects $O_{A1}, O_{A2}, \ldots, O_{An}$ identified in step 1.6 of the modified RDC algorithm illustrated in FIG. 12.

According to the embodiments, objects may be chosen guided by similarity, but trying also to increase diversity in the set of objects by choosing objects similar to the target, but dissimilar from one another, or by making other choices from the set of objects with similar traits.

According to one embodiment, the following combinations of parameters (q,b,t,x) may be used: (q=1,b=4,t=24, x=9) and (q=1,b=6,t=16,x=5).

Figure 15:
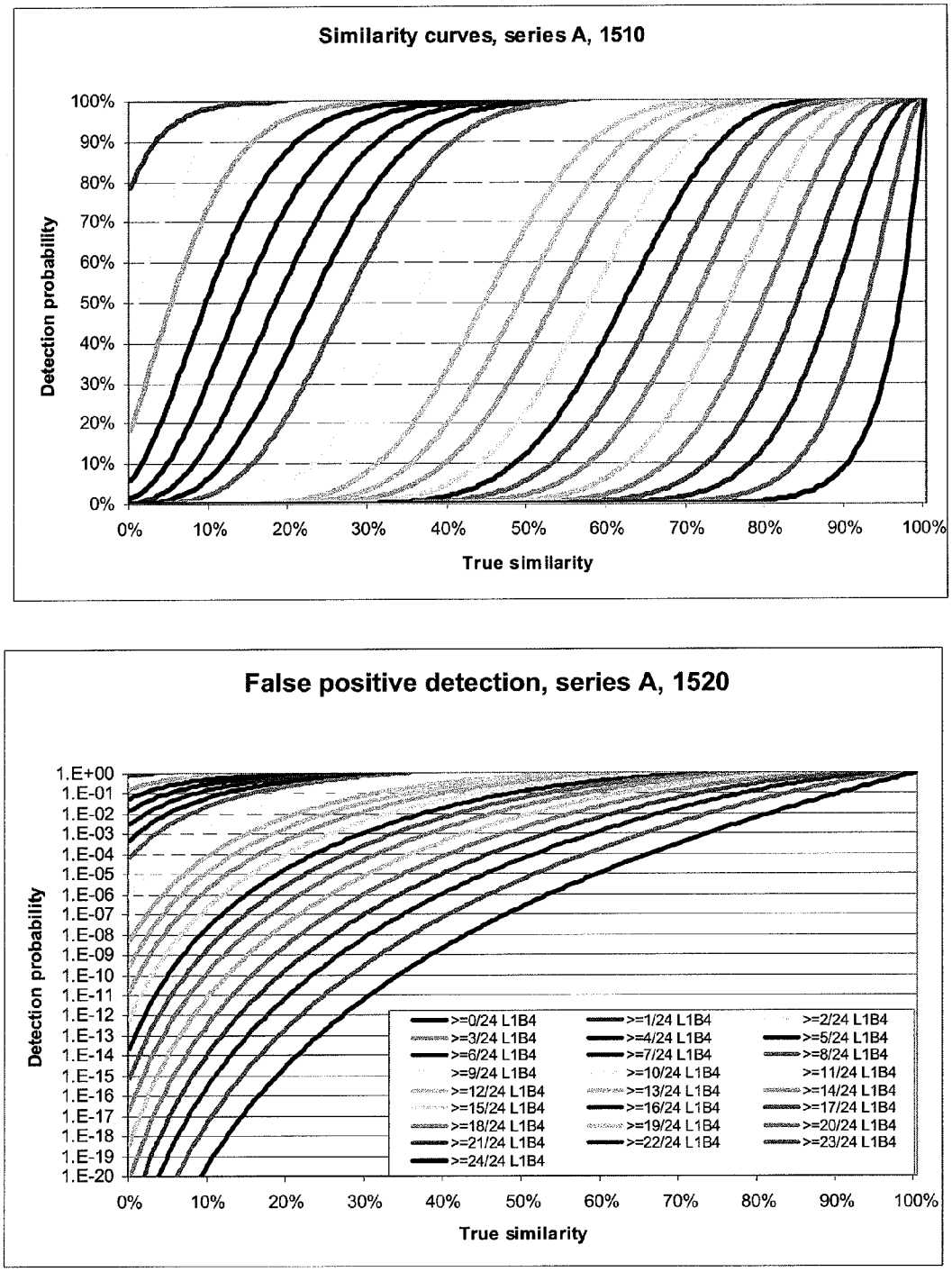
FIGS. 15 and 16 may be used when selecting the parameters for b and t.
Figure 16:
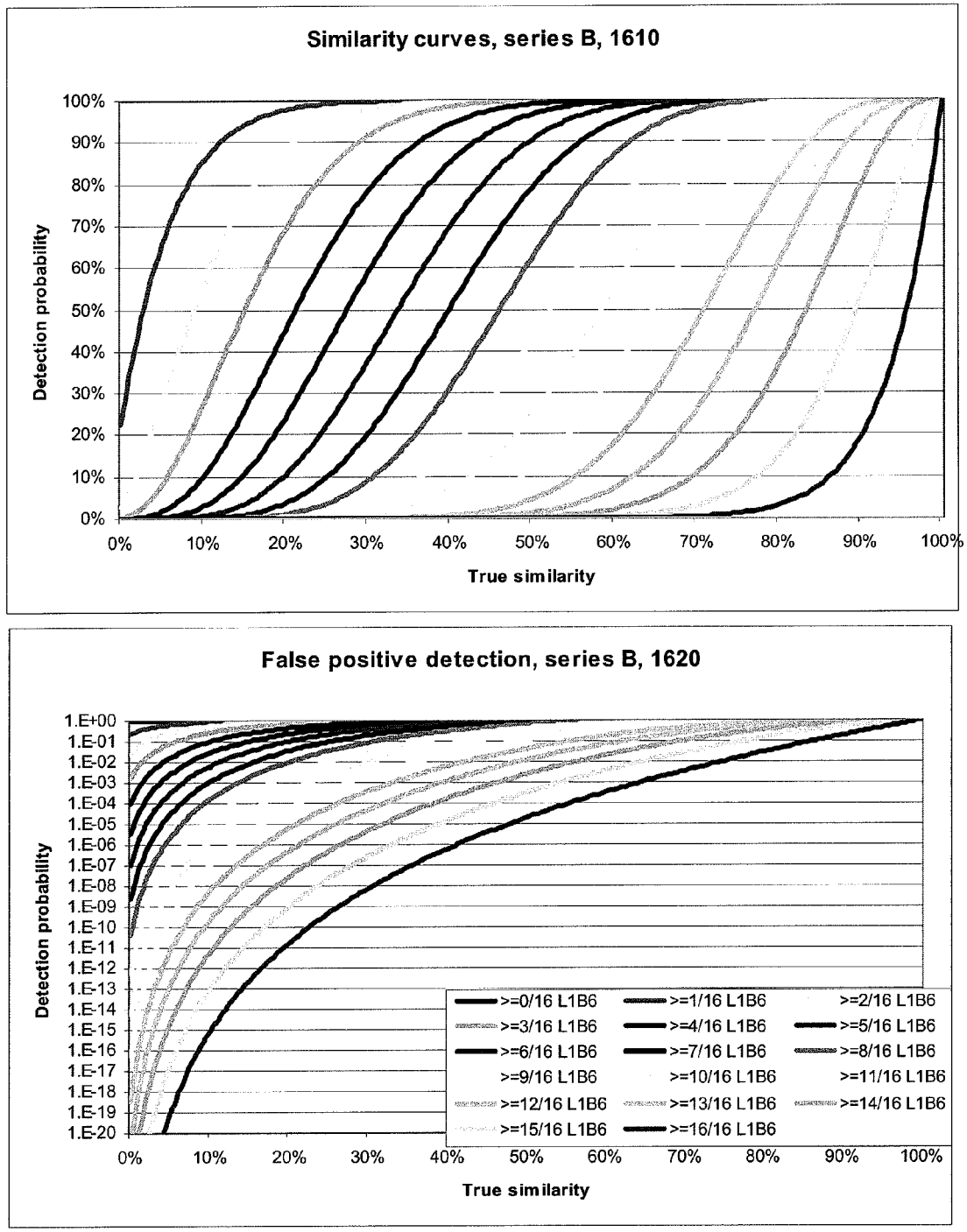

FIGS. 15 and 16 may be used when selecting the parameters for b and t, in accordance with aspects of the present invention. The curves for the probability of detecting matches and for false positives first for (b=4, t=24) is shown in FIG. 15, and then for (b=6, t=16) is shown in FIG. 16. Both sets of similarity curves (1510 and 1610) allow the probabilistic detection similar objects with true similarity in the range of 0-100%. According to one embodiment, the false positive rate illustrated in displays 1520 and 1620 drops to an acceptable level at roughly 10 of 24 (providing 40 bits of true match), and at 6 of 16 (36 bits of match); the difference in the required number of bits is primarily due to the reduced number of combinations drawing from a smaller set. The advantage of the larger set is increased recall: fewer useful matches will escape attention; the cost is the increased rate of falsely detected matches. To improve both precision and recall, the total number of bits may be increased. Switching to (b=5, t=24), for instance would dramatically improve precision, at the cost of increasing memory consumption for object traits. A Compact Representation for the Sets of Traits It is advantageous for both Device A and Device B to cache the sets of traits for all of their stored objects so that they don't have to recompute their traits every time they execute steps 1.6 and 1.5, respectively, of the modified RDC algorithm (See FIG. 12 and related discusssion). To speed up the RDC computation, the trait information may be stored in Device A's and Device B's memory, respectively.

The representation described below uses on the order of t+p memory bytes per object, where t is the number of traits and p is the number of bytes required to store a reference or a pointer to the object. Examples of references are file paths, file identifiers, or object identifiers. For typical values of t and p, this approach can support one million objects using less than 50 MB of main memory. If a device stores more objects, it may use a heuristic to prune the number of objects that are involved in the similarity computation. For instance, very small objects may be eliminated a priori because they cannot contribute too many chunks in steps 4 and 8 of the RDC algorithm illustrated in FIG. 12.

Figure 17:
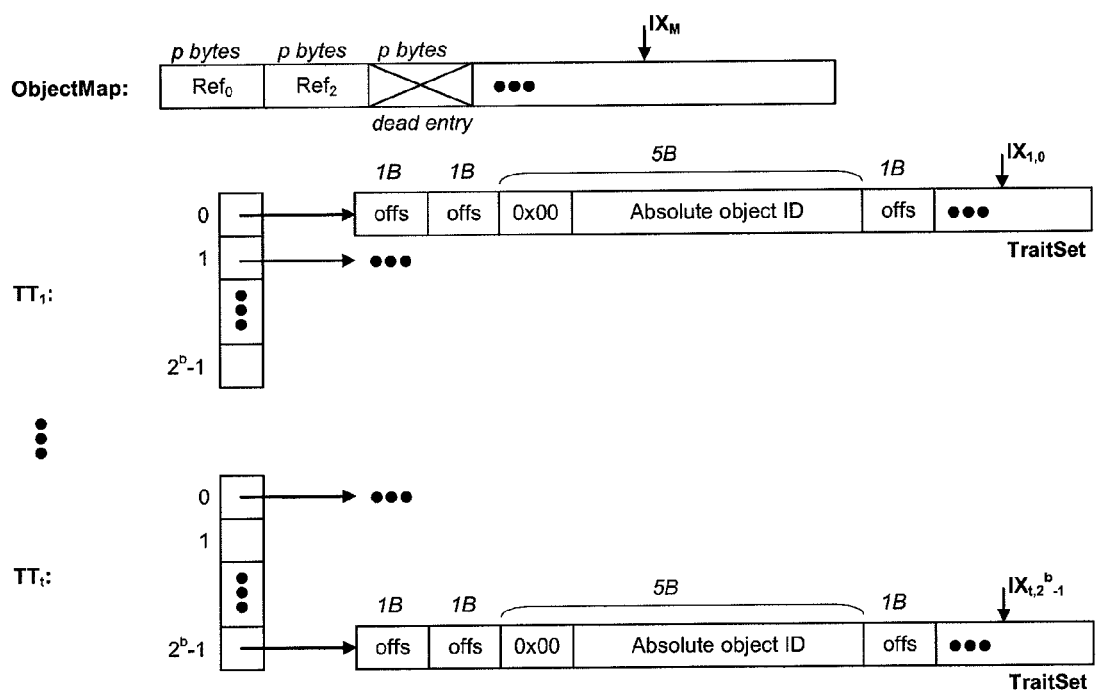
FIG. 17 illustrates data structures that make up a compact representation of: an Object Map and a set of Trait Tables.

FIG. 17 illustrates data structures that make up a compact representation of: an ObjectMap and a set of t Trait Tables, in accordance with aspects of the invention.

Initially, short identifiers, or object IDs, are assigned to all of the objects. According to one embodiment, these identifiers are consecutive non-negative 4-byte integers, thus allowing the representation of up to 4 Billion objects.

A data structure (ObjectMap) maintains the mapping from object IDs to object references. It does not matter in which order objects stored on a device get assigned object IDs. Initially, this assignment can be done by simply scanning through the device's list of stored objects. If an object gets deleted, its corresponding entry in ObjectMap is marked as a dead entry (by using a reserved value for the object reference). If an object is modified, it corresponding entry in ObjectMap is marked as a dead entry, and the object gets assigned the next higher unused object ID.

When the ObjectMap becomes too sparse (something that can be easily determined by keeping track of the total size and the number of dead entries), both the ObjectMap and the Trait Tables are discarded and rebuilt from scratch.

The Trait Tables form a two-level index that maps from a trait number (1 to t) and a trait value (0 to $2^b-1$) to a TraitSet, the set of object IDs for the objects having that particular trait. A TraitSet is represented as an array with some unused entries at the end for storing new objects. An index $IX_{i,k}$ keeps track of the first unused entry in each TraitSet array to allow for appends.

Within a TraitSet, a particular set of objects is stored in ascending order of object IDs. Because the space of object IDs is kept dense, consecutive entries in the TraitSets can be expected to be "close" to each other in the object ID space on average, two consecutive entries should differ by about $t*2^b$ (but by at least 1). If the values of t and b are chosen so that $t*2^b<<255$, then consecutive entries can be encoded using on average only one unsigned byte representing the difference between the two object ID, as shown in FIG. 17. An escape mechanism is provided by using the 0x00 byte to indicate that a full 4-byte object ID follows next, for the rare cases where the two consecutive object IDs differ by more than 255.

According to a different embodiment, if an object ID difference is smaller than 256 then it can be represented as a single byte, otherwise the value zero is reserved to indicate that subsequent bytes represent the delta minus 256, say, by using a 7 in 8 representation. Then, for b=6, 98% of deltas will fit in one byte, 99.7% fit in two bytes, and all but twice in a billion into three bytes. It has been found that this scheme uses on average 1.02 bytes per object, compared to 1.08 bytes per object for the scheme shown in FIG. 17.

Entries in the Trait Tables corresponding to dead object IDs can be left in the Trait Tables. New entries are appended at the end (using indices $IX_{1,0} \ldots IX_{t,2^b-1}$).

Finding Similar Objects using the Compact Representation

Figure 18:
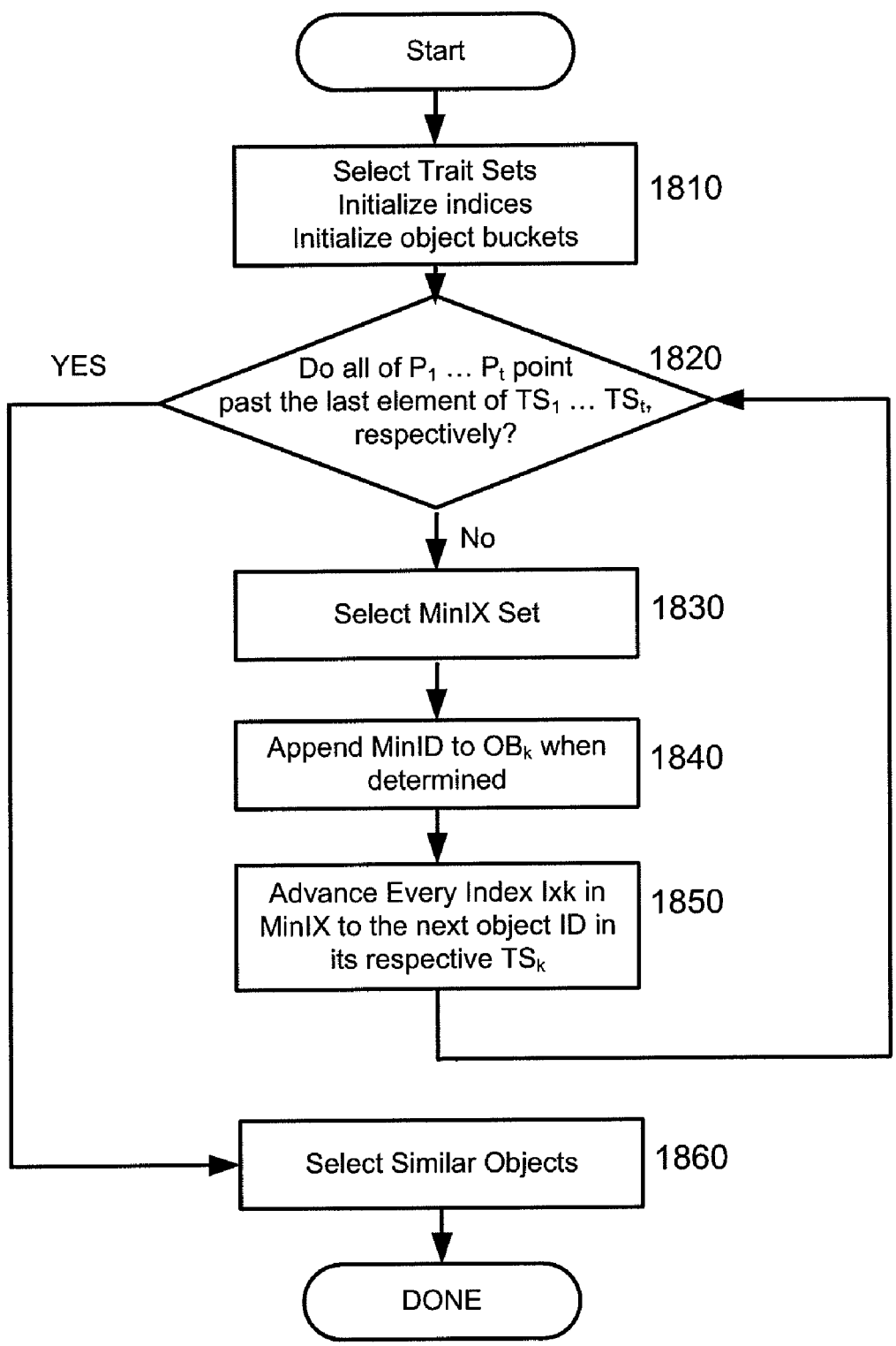
FIG. 18 illustrates a process for computing similar traits, in accordance with aspects of the present invention.

FIG. 18 illustrates a process for finding objects with similar traits, in accordance with aspects of the invention. According to one embodiment, to compute SimilarTraits($O_B$, Objects$_A$, x), the steps are are similar to a merge sort algorithm. The algorithm uses (t−x+1) object buckets, $OB_x OB_t$, that are used to store objects belonging to Objects$_A$ that match at least x and up to and including t traits of $O_B$, respectively.

1. At block 1810, select the t TraitSets corresponding to the t traits of $O_B$: $TS_1 \ldots TS_t$. Initialize $OB_x OB_t$ to empty. Initialize indices $P_i \ldots P_t$ to point to the first element of $TS_1 \ldots TS_t$, respectively. $TS_k[P_k]$ is the notation for the object ID pointed to by $P_k$.
2. At decision block 1820, if all of $P_1 \ldots P_t$ point past the last element of their TraitSet arrays $TS_1 \ldots TS_t$, respectively, then go to step 6 (block 1860).
3. At block 1830, the MinP set is selected which is the set of indices pointing to the minimum object ID, as follows:

$MinP = \{P_k | \forall j \notin [1,t] \cdot TS_j[P_j] \geq TS_k[P_k]\}$

Let MinID be the minimum object ID pointed to by all the indices in MinP.
4. At block 1840, Let k=|MinP|, which corresponds to the number of matching traits. If k>x and if ObjectMap (MinP) is not a dead entry, then append MinID to $OB_k$.
5. Advance every index $P_k$ in MinP to the next object ID in its respective TraitSet array $TS_k$. Go to step 2 (block 1820).
6. At block 1860, select the similar objects by first selecting objects from $OB_t$, then from $OB_{t-1}$, etc., until the desired number of similar objects has been selected or no more objects are left in $OB_x$. The object IDs produced by the above steps can be easily mapped into object references by using the ObjectMap.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for identifying objects for remote differential compression, comprising:
   a remote device configured to perform steps, comprising:
   receive a request for an Object $O_B$;
   send a set of traits of Object $O_B$ to a local device;
   partition Object $O_B$ into chunks and compute signatures for each of the chunks;
   send the list of chunk signatures to the local device; and
   provide requested chunks when requested; and
   the local device configured to perform steps, comprising:
   request Object $O_B$ from the remote device;
   receive the set of traits of Object $O_B$ from the remote device;
   use the set of traits of Object $O_B$ to identify similar objects that it already stores on the local device;

partition the similar objects into chunks;
compute signatures for each of the similar object chunks;
receive the list of chunk signatures from the remote device;
compare the received signatures against the locally computed signatures;
request chunks from the remote device that did not match in the comparison;
receive the requested chunks; and
reconstruct Object $O_B$ using the received chunks and chunks reused from the similar objects.

2. The system of claim 1, wherein the local device is further configured, to:
group the signatures into shingles;
compute at least one shingle signature for each of the shingles;
map the shingle signatures into image sets;
calculate pre-traits from the image sets; and
compute the traits using the pre-traits, wherein the traits are smaller in size as compared to the pre-traits using the traits to identify candidate objects that are at least somewhat similar to the object; and
select final objects from the identified candidate objects.

3. The system of claim 2, wherein partitioning the object into chunks comprises: generating fingerprints at each byte position of the object by using the values of the bytes in a small window around each position and chunking the object based on the fingerprints.

4. The system of claim 3, wherein mapping the shingles into image sets on the local device, comprises: applying at least one hash functions to each shingle.

5. The system of claim 4, wherein calculating the pre-traits from the image sets, comprises applying a deterministic mathematical function that selects one of the computed hash values from each image set, wherein the deterministic mathematical function is selected from a maxima function and a minima function.

6. The system of claim 5, wherein calculating the traits using the pre-traits, comprises applying a deterministic function to each of the pre-traits that creates traits each having a predetermined number of bits that is smaller than the traits.

7. The system of claim 3, wherein using the traits to identify candidate objects that are at least somewhat similar to the object comprises calculating the number of traits that match between the two objects.

8. The system of claim 3, wherein the local device is further configured to:
create an object map that compactly represents the object IDs on the local device, wherein each compact representation is represented using a predetermined size; and
create trait tables that form at least a two-level index that maps from a trait number and a trait value to a trait set.

9. The system of claim 8, further comprising rebuilding the object map when it determined that the object map is sparse.

10. The system of claim 8, further comprising: finding objects with similar traits, including steps for:
creating buckets ($OB_x \ldots OB_t$) to store local objects that match at least x traits of a remote object $O_B$;
selecting t TraitSets ($TS_1 \ldots TS_t$) corresponding to t traits of object $O_B$;
initializing indices ($P_1 \ldots P_t$) to point to the first element of $TS_1 \ldots TS_t$, respectively, wherein $TS_k[P_k]$ is the notation for the object ID pointed to by $P_k$;
selecting a desired number of similar objects when it is determined that each of $P_1 \ldots P_t$ point past the last element of their TraitSet arrays $TS_1 \ldots TS_t$, respectively,
selecting a MinP set, wherein the MinP set is the set of indices pointing to the minimum object ID;
setting MinID to be the minimum object ID pointed to by all the indices in MinP;
appending MinID to $OB_k$ when it is determined that $k \geq x$ and ObjectMap(MinP) is not a dead entry, wherein k=|MinP|, which corresponds to the number of matching traits; and
advancing each index $P_k$ in MinP to the next object ID in its respective TraitSet array $TS_k$.

11. The system of claim 10, wherein selecting a desired number of similar objects comprises first selecting objects from $OB_t$, and decrementing t and selecting from $OB_t$ until the desired number of similar objects has been selected.

12. The system of claim 10, wherein selecting a desired number of similar objects comprises first selecting objects from $OB_t$, and decrementing t and selecting from $OB_t$.

* * * * *